US012717112B2

(12) United States Patent
Lee et al.

(10) Patent No.: US 12,717,112 B2
(45) **Date of Patent: *Aug. 25, 2026**

(54) LENS DRIVING DEVICE AND CAMERA MODULE

(71) Applicant: LG INNOTEK CO., LTD., Seoul (KR)

(72) Inventors: Kap Jin Lee, Seoul (KR); Jung Seok Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 410 days.

This patent is subject to a terminal disclaimer.

(21) Appl. No.: 18/224,812

(22) Filed: Jul. 21, 2023

(65) Prior Publication Data

US 2023/0358994 A1 Nov. 9, 2023

Related U.S. Application Data

(63) Continuation of application No. 16/498,358, filed as application No. PCT/KR2018/002876 on Mar. 12, 2018, now Pat. No. 11,762,168.

(30) Foreign Application Priority Data

Mar. 30, 2017 (KR) ........................ 10-2017-0041105
Mar. 30, 2017 (KR) ........................ 10-2017-0041106
Mar. 30, 2017 (KR) ........................ 10-2017-0041119

(51) Int. Cl.
*G02B 7/08* (2021.01)
*G02B 27/64* (2006.01)
(Continued)

(52) U.S. Cl.
CPC ............. *G02B 7/08* (2013.01); *G02B 27/646* (2013.01); *G03B 19/22* (2013.01); *G03B 30/00* (2021.01)

(58) Field of Classification Search
CPC .......... G02B 7/08; G02B 7/09; G02B 27/646; G03B 19/22; G03B 30/00
See application file for complete search history.

(56) References Cited

U.S. PATENT DOCUMENTS 5,229,983 A 7/1993 Kawamura et al.
9,451,167 B2 * 9/2016 Lee ...................... G02B 13/003
(Continued)

FOREIGN PATENT DOCUMENTS

CN 103117637 A 5/2013
CN 105807538 A 7/2016
(Continued)

OTHER PUBLICATIONS

Park U.S. Appl. No. 17/924,051, filed Apr. 19, 2021 (Year: 2021).*
(Continued)

*Primary Examiner* — Cara E Rakowski
(74) *Attorney, Agent, or Firm* — Birch, Stewart, Kolasch & Birch, LLP

(57) ABSTRACT

A lens driving device includes a housing; a bobbin disposed in the housing; a magnet and a dummy member, arranged at the housing; a first coil disposed on the bobbin; and a substrate including a second coil facing the magnet. The housing includes a first and a second side part facing each other and a third and a fourth side part facing each other. The magnet includes a first magnet unit disposed at the first side part, a second magnet unit disposed at the third side part, and a third magnet unit disposed at the fourth side part. The dummy member is disposed at the second side part.

20 Claims, 13 Drawing Sheets

(51) Int. Cl.
*G03B 19/22* (2021.01)
*G03B 30/00* (2021.01)

(56) References Cited

U.S. PATENT DOCUMENTS

| | | | | |
|---|---|---|---|---|
| 9,618,768 | B2 * | 4/2017 | Yeo | G02B 7/02 |
| 9,720,204 | B2 * | 8/2017 | Yoo | G02B 27/0006 |
| 9,736,377 | B2 * | 8/2017 | Lee | H04N 23/54 |
| 9,766,476 | B2 * | 9/2017 | Yeo | G02B 7/08 |
| 9,781,322 | B2 * | 10/2017 | Cho | H04N 23/57 |
| 9,917,997 | B2 * | 3/2018 | Cho | H04N 23/57 |
| 10,095,047 | B2 * | 10/2018 | Min | H04N 23/55 |
| 10,268,047 | B2 * | 4/2019 | Yeo | G02B 7/09 |
| 10,367,982 | B2 * | 7/2019 | Cho | H04N 23/57 |
| 10,502,924 | B2 * | 12/2019 | Lee | H02K 41/0356 |
| 10,574,868 | B2 * | 2/2020 | Kim | G02B 27/646 |
| 10,649,227 | B2 * | 5/2020 | Min | G02B 27/646 |
| 10,768,437 | B2 * | 9/2020 | Park | G02B 7/08 |
| 11,199,723 | B2 * | 12/2021 | Yeo | G02B 7/09 |
| 11,543,672 | B2 * | 1/2023 | Park | H02K 41/0356 |
| 11,573,395 | B2 * | 2/2023 | Jung | H04N 23/57 |
| 11,619,801 | B2 * | 4/2023 | Shin | H04N 23/51 359/557 |
| 11,714,255 | B2 * | 8/2023 | Lee | G02B 7/08 348/374 |
| 11,740,430 | B2 * | 8/2023 | Lee | H02K 41/0356 348/208.11 |
| 11,754,802 | B2 * | 9/2023 | Kim | H04N 23/57 348/208.11 |
| 11,762,168 | B2 * | 9/2023 | Lee | G02B 7/08 359/823 |
| 11,762,215 | B2 * | 9/2023 | Park | G03B 5/00 359/554 |
| 11,914,171 | B2 * | 2/2024 | Yeo | H02K 41/0356 |
| 11,982,820 | B2 * | 5/2024 | Park | H01F 7/20 |
| 11,982,869 | B2 * | 5/2024 | Jung | G02B 13/001 |
| 12,066,744 | B2 * | 8/2024 | Jung | G03B 30/00 |
| 12,099,210 | B2 * | 9/2024 | Park | H02K 41/0356 |
| 12,105,348 | B2 * | 10/2024 | Min | G02B 7/08 |
| 12,298,531 | B2 * | 5/2025 | Min | H04N 23/57 |
| 12,374,481 | B2 * | 7/2025 | Lee | G03B 30/00 |
| 12,386,146 | B2 * | 8/2025 | Jung | G02B 7/00 |
| 2008/0192124 | A1 | 8/2008 | Nagasaki | |
| 2009/0219633 | A1 | 9/2009 | Li et al. | |
| 2009/0225454 | A1 | 9/2009 | Yoshioka et al. | |
| 2010/0149667 | A1 | 6/2010 | Wada et al. | |
| 2012/0200176 | A1 | 8/2012 | Park | |
| 2013/0141541 | A1 | 6/2013 | Jung et al. | |
| 2015/0022891 | A1 | 1/2015 | Hu et al. | |
| 2015/0316744 | A1 | 11/2015 | Chen | |
| 2015/0346453 | A1 | 12/2015 | Cheong et al. | |
| 2016/0109721 | A1 * | 4/2016 | Min | G02B 27/646 359/557 |
| 2016/0177479 | A1 | 6/2016 | Chiu et al. | |
| 2016/0187671 | A1 | 6/2016 | Park et al. | |
| 2017/0168314 | A1 | 6/2017 | Chan et al. | |
| 2018/0027185 | A1 | 1/2018 | Miller et al. | |
| 2019/0204532 | A1 | 7/2019 | Konuma et al. | |

FOREIGN PATENT DOCUMENTS

| | | | |
|---|---|---|---|
| CN | 106226887 | A | 12/2016 |
| CN | 206039001 | U | 3/2017 |
| CN | 104678531 | B | 10/2017 |
| CN | 107340668 | A | 11/2017 |
| JP | 2003-115124 | A | 4/2003 |
| JP | 2010-15107 | A | 1/2010 |
| JP | 2012-103298 | A | 5/2012 |
| JP | 2015-99282 | A | 5/2015 |
| JP | 2015-127724 | A | 7/2015 |
| JP | 2018-20939 | A | 2/2016 |
| JP | 2016-153838 | A | 8/2016 |
| JP | 2017-227850 | A | 12/2017 |
| KR | 10-2007-0088346 | A | 8/2007 |
| KR | 10-1017341 | B1 | 2/2011 |
| KR | 10-2012-0004028 | A | 1/2012 |
| KR | 10-2012-0090379 | A | 8/2012 |
| KR | 10-2013-0073379 | A | 7/2013 |
| KR | 10-2015-0113675 | A | 10/2015 |
| KR | 10-2016-0045385 | A | 4/2016 |
| KR | 10-2016-0082035 | A | 7/2016 |
| KR | 10-2018-0086581 | A | 7/2016 |
| KR | 10-2016-0112489 | A | 9/2016 |
| KR | 10-2016-0022656 | A | 3/2018 |
| TW | 201830121 | A | 8/2018 |
| WO | WO 2016/156996 | A1 | 10/2016 |
| WO | WO 2017/043849 | A1 | 3/2017 |
| WO | WO 2018/107725 | A1 | 6/2018 |

OTHER PUBLICATIONS

Lee et al. U.S. Appl. No. 19/239,348, filed Jun. 16, 2025 (Year: 2025).*

Machine translation of CN104678531 retrieved electronically from Espacenet Feb. 6, 2023 (Year: 2023).

Machine translation of WO2018107725 retrieved electronically from Espacenet Mar. 9, 2022 (Year: 2022).

* cited by examiner

FIG. 4

LENS DRIVING DEVICE AND CAMERA MODULE

CROSS-REFERENCE TO RELATED APPLICATIONS

This application is a Continuation U.S. application Ser. No. 16/498,358, filed on Sep. 26, 2019, which is the National Phase of PCT International Application No. PCT/KR2018/002876, filed on Mar. 12, 2018, which claims priority under 35 U.S.C. 119(a) to Patent Application No. 10-2017-0041105, filed in the Republic of Korea on Mar. 30, 2017, Patent Application No. 10-2017-0041106, filed in the Republic of Korea on Mar. 30, 2017, and Patent Application No. 10-2017-0041119, filed in the Republic of Korea on Mar. 30, 2017, all of which are hereby expressly incorporated by reference into the present application.

TECHNICAL FIELD

The present embodiment relates to a lens driving device and a camera module.

BACKGROUND ART

The following description provides background information for the present embodiment and does not describe the prior art.

As various portable terminals are widely spread and commonly used, and wireless Internet services has been commercialized, the demands of consumers related to portable terminals have been diversified and various kinds of additional devices have been installed in portable terminals.

As a typical example among them, there is a camera module for taking a picture or a video of a subject. Meanwhile, in recent years, a dual camera module in which two camera modules are arranged side by side has been studied.

However, in the dual camera module of the prior art, the distances between the camera modules are narrow and there is a problem that mutual magnetic field interference occurs.

SUMMARY OF THE INVENTION

Technical Subject

The present embodiment is intended to provide a structure capable of eliminating mutual interference between the magnets in a structure of a lens driving device for dual OIS.

Furthermore, in order to secure the magnetic force of the magnet for AF driving in the above-mentioned structure, a structure for securing the length of the magnet in z-axis direction is provided.

Technical Solution

A lens driving device according to the present embodiment comprises: a housing; a bobbin disposed in the housing; a magnet and a dummy member, arranged at the housing; a first coil disposed on the bobbin; and a substrate comprising a second coil facing the magnet, wherein the housing comprises a first and a second side part facing each other and a third and a fourth side part facing each other, the magnet comprises a first magnet unit disposed at the first side part, a second magnet unit disposed at the third side part, and a third magnet unit disposed at the fourth side part, and the dummy member may be disposed at the second side part.

A lens driving device according to the present embodiment comprises: a housing; a bobbin disposed in the housing; a magnet arranged at the housing; a first coil disposed on the bobbin; and a substrate comprising a second coil facing the magnet, wherein the housing comprises: a first and a second side part facing each other; and a third and a fourth side part facing each other, the magnet comprises: a first magnet unit disposed at the first side part; a second magnet unit disposed at the third side part; and a third magnet unit disposed at the fourth side part, and the first magnet unit is a 2-pole magnet, the second magnet unit and the third magnet unit may be 4-pole magnets.

The first coil may comprise a first coil unit facing the second magnet unit, and a second coil unit facing the third magnet unit.

The first coil further comprises a connecting portion connecting the first coil unit and the second coil unit, wherein the connecting portion of the first coil may be disposed between the first magnet unit and the bobbin or disposed between the dummy member and the bobbin.

The first coil comprises a first coil unit facing the second magnet unit in a horizontal direction, and a second coil unit facing the third magnet unit in the horizontal direction, wherein the second coil may comprise a third coil unit facing the first magnet unit in a vertical direction, a fourth coil unit facing the second magnet unit in the vertical direction, and a fifth coil unit facing the third magnet unit in the vertical direction.

The substrate comprises a hole, wherein the hole of the substrate may be formed closer to one side surface of the substrate adjacent to the dummy member.

The second magnet unit and the third magnet unit move the bobbin in the optical axis direction, and the first magnet unit, the second magnet unit, and the third magnet unit may move the housing in a direction perpendicular to the optical axis direction.

Each of the second magnet unit and the third magnet unit comprises a first surface facing the first coil, wherein the first surface may have two polarities.

Each of the first magnet unit to the third magnet unit comprises a second surface facing the second coil, wherein the second surface may have two polarities.

A lens driving device according to the present embodiment comprises: a housing; a bobbin disposed in the housing; a magnet arranged at the housing; a first coil disposed on the bobbin; and a first substrate comprising a second coil facing the magnet, wherein the housing comprises: a first and a second side part facing each other; and a third and a fourth side part facing each other, wherein the magnet comprises a first magnet unit disposed on a first side part of the housing, a second magnet unit disposed on a third side part of the housing, and a third magnet unit disposed on a fourth side part of the housing, and wherein the first coil comprises a plurality of coil units, the plurality of coil units comprises a first coil unit facing the second magnet unit and a second coil unit facing the third magnet unit, and the coil unit may not be disposed between the bobbin and the first magnet unit.

A lens driving device according to the present embodiment comprises: a housing; a bobbin disposed in the housing; a magnet and a dummy member, arranged at the housing; a first coil disposed on the bobbin; and a substrate comprising a second coil facing the magnet, wherein the housing comprises a first and a second side part facing each other and a third and a fourth side part facing each other, the magnet comprises a first magnet unit disposed at the first side part, a second magnet unit disposed at the third side part, and a third magnet unit disposed at the fourth side part, and the dummy member may be disposed at the second side part.

A lens driving device according to the present embodiment comprises: a housing; a bobbin disposed in the housing; a magnet arranged at the housing; a first coil disposed on the bobbin; and a substrate comprising a second coil facing the magnet, wherein the housing comprises: a first and a second side part facing each other; and a third and a fourth side part facing each other, the magnet comprises: a first magnet unit disposed at the first side part; a second magnet unit disposed at the third side part; and a third magnet unit disposed at the fourth side part, and the first magnet unit is a 2-pole magnet, the second magnet unit and the third magnet unit may be 4-pole magnets.

The first coil comprises a plurality of coil units, and the plurality of coil units may comprise a first coil unit facing the second magnet unit and a second coil unit facing the third magnet unit.

The coil unit may not be disposed between the bobbin and the first magnet unit.

The coil unit may not be disposed between the bobbin and the dummy member.

The first magnet unit may be a 2-pole magnet, and the second magnet unit and the third magnet unit may be 4-pole magnets.

A dummy member disposed on the second side part of the housing may be included.

The second coil may not be disposed between the dummy member and the substrate.

The dummy member may comprise a non-magnetic material.

The first coil further comprises a connecting portion connecting the first coil unit and the second coil unit, and the connecting portion of the first coil may be disposed between the first magnet unit and the bobbin or disposed between the dummy member and the bobbin.

The substrate may comprise a hole, and the hole of the substrate may be formed closer to one side surface of the substrate.

The one side surface of the substrate may be adjacent to the dummy member.

The shortest distance from the other side surface, located at the opposite side of the one side surface of the substrate, to the hole may be larger than the shortest distance from the one side surface to the hole.

The first coil may comprise a first coil unit facing the second magnet unit in a horizontal direction, and a second coil unit facing the third magnet unit in the horizontal direction, and the second coil comprises a third coil unit facing the first magnet unit in a vertical direction, a fourth coil unit facing the second magnet unit in the vertical direction, and a fifth coil unit facing the third magnet unit in the vertical direction.

The first coil unit and the second coil unit may have at least any one shape among an elliptical shape, a track shape, and a closed curve shape.

The second magnet unit and the third magnet unit move the bobbin in the optical axis direction, and the first magnet unit, the second magnet unit, and the third magnet unit move the housing in a direction perpendicular to the optical axis direction.

The bobbin comprises a first protrusion and a second protrusion disposed at the opposite side of the first protrusion, wherein the first coil unit is disposed to surround the first protrusion, and the second coil unit may be disposed to surround the second protrusion.

The lens driving device comprises: an upper elastic member disposed on the bobbin and coupled to the bobbin and the housing; and a support member coupled to the upper elastic member and the substrate, wherein the first coil unit and the second coil unit are electrically connected, and the upper elastic member comprises a first upper elastic unit and a second upper elastic unit that are spaced apart from each other, wherein one side end portion of the first coil unit is coupled to the first upper elastic unit and one side end portion of the second coil may be coupled to the second upper elastic unit.

Each of the second magnet unit and the third magnet unit comprises a first surface facing the first coil, wherein the first surface may have two polarities.

Each of the first to third magnet units comprises a second surface facing the second coil, wherein the second surface may have two polarities.

The camera module according to the present embodiment may comprise the first lens driving device and a second lens driving device adjacent to the first lens driving device.

The second lens driving device is disposed adjacent to a fourth side part of the housing of the first lens driving device, and the second lens driving device comprises a housing; a bobbin disposed in the housing of the second lens driving device; a third coil disposed on an outer circumferential surface of the bobbin of the second lens driving device; a magnet disposed in the housing of the second lens driving device and facing the third coil; and a fourth coil facing the magnet of the second lens driving device, wherein the magnet of the second lens driving device may comprise four magnet units disposed at the corner portions of the housing of the second lens driving device.

The dual camera module according to the present embodiment comprises a first lens driving device and a second lens driving device comprising a second surface facing the first surface of the first lens driving device, the first lens driving device comprises: a housing; a bobbin disposed within the housing; a first coil disposed in the bobbin; a magnet disposed in the housing and facing the first coil; a base disposed below the housing; a substrate comprising a second coil facing the magnet and disposed on the base; an upper elastic member disposed above the bobbin and coupled to the bobbin and the housing; and a support member coupled to the upper elastic member and the substrate, wherein the magnet is disposed on the side part of the housing, the upper surface of the magnet is overlapped with the upper elastic member in the direction of the optical axis, and the upper surface of the magnet is overlapped with the upper elastic member in the direction of the optical axis and may comprise a first portion that is not overlapped with the housing in the optical direction.

The upper surface of the magnet further comprises a second portion overlapped with the housing in the direction of the optical axis and not overlapped with the upper elastic member in the direction of the optical axis, wherein an upper plate of the housing may be disposed above the second portion of the upper surface of the magnet.

The first portion of the upper surface of the magnet may be in contact with the upper elastic member.

In the dual camera module, the first lens driving device may further comprise a cover coupled to the base and accommodating the housing therein, and a stopper protruding toward the upper plate of the cover may be disposed on the upper plate of the housing.

The housing comprises a first side part disposed on the first surface side of the first lens driving device, a second side part disposed on the opposite side of the first side, and a second side part disposed between the first side part and the second side part, wherein the magnet may comprise a first magnet disposed on a second side part of the housing, a second magnet disposed on a third side part of the housing, and a third magnet disposed on the second side part of the housing, and a third magnet disposed on the fourth side part.

A dummy member having a mass corresponding to the first magnet may be disposed on the first side part of the housing.

The top plate of the housing may be disposed on each of the second side part, the third side part and the fourth side part and may not be disposed on the first side part.

The lens driving device according to the present embodiment comprises a housing; a bobbin disposed in the housing; a first coil disposed in the bobbin; a magnet disposed in the housing and facing the first coil; a base disposed below the housing; a substrate comprising a second coil facing the magnet and disposed on a base; an upper elastic member disposed above the bobbin and coupled to the bobbin and the housing; and a support member coupled to the upper elastic member and the substrate, wherein the magnet is disposed on the side part of the housing, and the upper surface of the magnet may be disposed on the same plane as the upper surface of the housing to which the upper elastic member is coupled.

The dual camera module according to the present embodiment comprises a first lens driving device and a second lens driving device comprising a second surface facing the first surface of the first lens driving device, the first lens driving device comprises: a housing; a bobbin disposed within the housing; a first coil disposed in the bobbin; a magnet disposed in the housing and facing the first coil; a base disposed below the housing; and a substrate comprising a second coil facing the magnet and disposed on the base, wherein the housing comprises a first side part disposed on the first surface side of the first lens driving device, a second side part disposed on the opposite side of the first side, and a second side part disposed between the first side part and the second side part, wherein the magnet may comprise a first magnet disposed on a second side part of the housing, a second magnet disposed on a third side part of the housing, and a third magnet disposed on the second side part of the housing, and a third magnet disposed on the fourth side part, wherein the second coil comprises a first coil unit facing the first magnet, a second coil unit facing the second magnet, and a third coil unit facing the third magnet, and the number of turns of the coil wound on the first coil unit may be larger than the number of turns of the coil wound on the second coil unit.

A dummy member comprising a non-magnetic material may be disposed on the first side part of the housing.

The number of turns of the coil wound on the third coil unit may correspond to the number of turns of the coil wound on the second coil unit.

The center axis of the bobbin may be disposed eccentrically from the center axis of the first lens driving device toward the direction of the dummy member.

The substrate may comprise a through hole corresponding to a lens coupled to the bobbin, and the through hole may be eccentrically disposed toward a first surface of the first lens driving device.

The substrate comprises a through hole, an inner circumferential surface formed by the through hole, a first side surface disposed on the first side part of the housing, and a second side surface disposed on the second side part of the housing, wherein the first coil unit is disposed between the inner circumferential surface of the substrate and the second side surface of the substrate and the second coil may not be disposed between the inner circumferential surface of the substrate and the first side surface of the substrate.

The substrate comprises a first side surface disposed on the first surface side of the first lens driving device, a second side surface disposed on the opposite side of the first side surface, and a third side surface and a fourth side surface disposed between the first side surface and the second side surface that are disposed on the opposite side from each other, wherein the distance between the third side surface and the fourth side surface may be longer than the distance between the first side surface and the second side surface.

The second coil comprises a first coil unit facing the first magnet, a second coil unit facing the second magnet, and a third coil unit facing the third magnet, wherein the length of the first coil unit in the lengthwise direction may be longer than the length in the lengthwise direction of each of the second coil unit and the third coil unit.

The second lens driving device comprises a housing; a bobbin disposed in the housing of the second lens driving device; a first coil disposed in the bobbin of the second lens driving device; a magnet disposed in the housing of the second lens driving device and facing the first coil of the second lens driving device; a base disposed below the housing of the second lens driving device; and a substrate disposed on the base of the second lens driving device, the second coil comprising a second coil facing the magnet of the second lens driving device, wherein the magnet of the second lens driving device may comprise four corner magnets disposed at four corner portions disposed between four side parts of the housing of the second lens driving device.

The lens driving device according to the present embodiment comprises a housing; a bobbin disposed inside the housing; a first coil disposed in the bobbin; a magnet and a dummy member disposed in the housing and facing the first coil; a base disposed below the housing; and a substrate disposed on the base, the substrate comprising a second coil facing the magnet, wherein the housing comprises a first side part, a second side part disposed at the opposite side of the first side part, and a third side part and a fourth side part disposed between the first side part and the second side part that are disposed on the opposite side from each other, the dummy member is disposed on a first side part of the housing, the magnet comprises a first magnet disposed on a second side part of the housing, a second magnet disposed on a third side part of the housing, and the center axis of the bobbin may be disposed eccentrically from the center axis of the housing toward the dummy member.

Advantageous Effects

Through the present embodiment, the mutual interference between the magnets in a structure of a lens driving device for dual OIS can be minimized.

Further, in the above-mentioned structure, a magnetic force for AF driving can be secured.

BRIEF DESCRIPTION OF THE DRAWINGS

Figure 4:
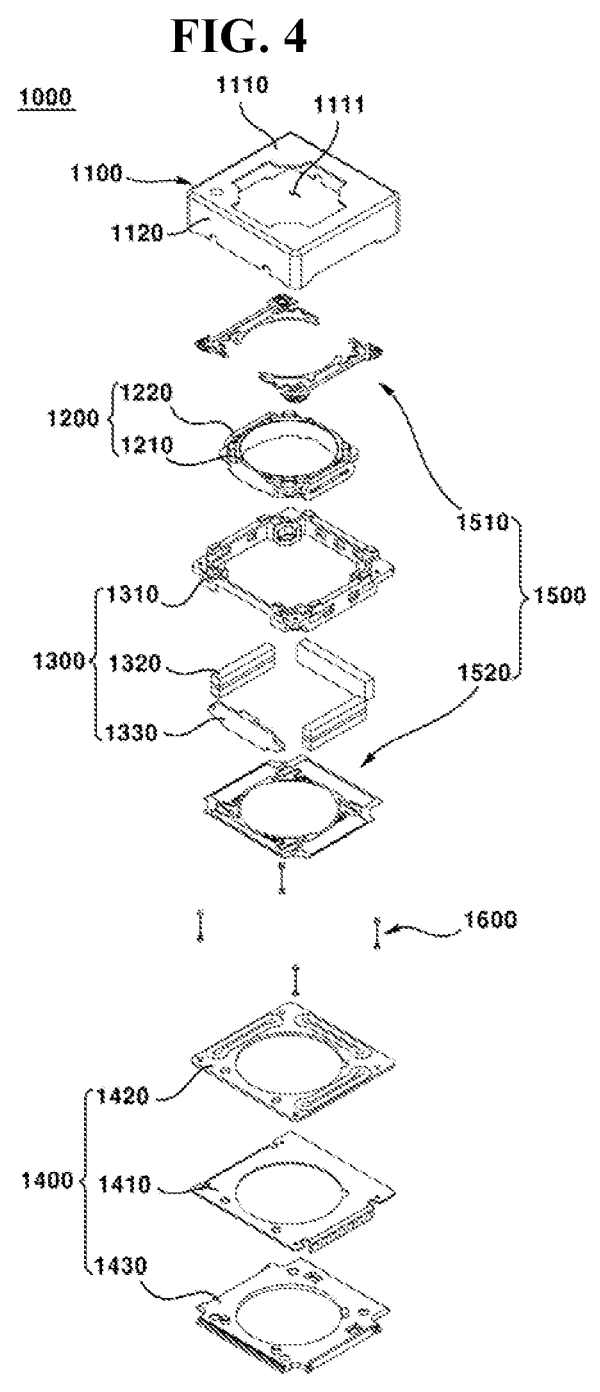

FIG. 4 is an exploded perspective view of the first lens driving device according to the present embodiment.

DETAILED DESCRIPTION

Hereinafter, some embodiments of the present invention will be described with reference to the accompanying drawings. However, the technical spirit of the present invention is not limited to some embodiments described.

In describing the components of the embodiment of the present invention, terms such as first, second, A, B, (a), and (b) may be used. These terms are merely intended to distinguish the components from other components, and the terms do not limit the nature, order or sequence of the components.

When a component is described as being "connected," "coupled," or "jointed" to another component, the component may be directly connected, coupled, or jointed to the other component, however, it should be understood that another element may be "connected," or "coupled" between components.

The "optical axis direction" used below is defined as the optical axis direction of the lens module in a state of being coupled to the lens driving device. On the other hand, "optical axis direction" can be corresponding to "vertical direction," "z-axis," and the like.

The "autofocus function" used below is defined as a function that automatically matches the focus on a subject by adjusting the distance to the image sensor by moving the lens module along the optical axis according to the distance of the subject so that a clear image of the subject can be obtained on the image sensor. On the other hand, "auto focus" can be used in combination with "auto focus (AF)".

The "camera shake correction function" used below is defined as a function of moving or tilting the lens module in the direction perpendicular to the optical axis direction so as to cancel the vibration (motion) generated in the image sensor by an external force. On the other hand, "camera shake correction" can be used in combination with "optical image stabilization (OIS)".

Hereinafter, the configuration of an optical device according to this embodiment will be described with reference to the drawings.

Figure 15:
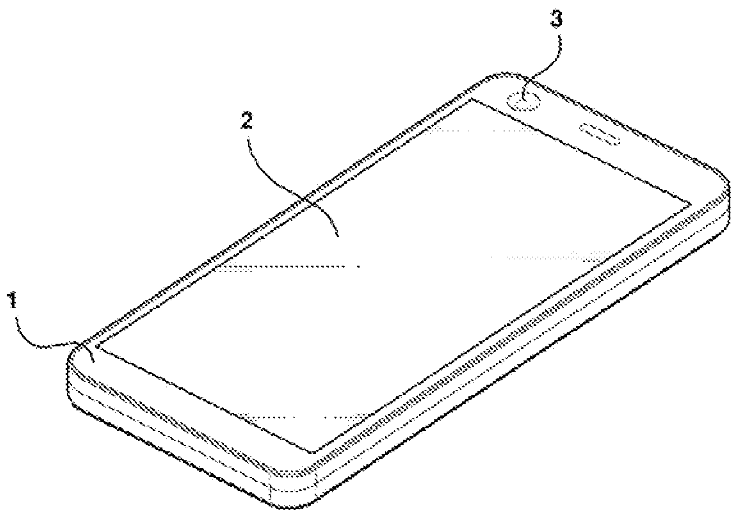
FIG. 15 is a perspective view of an optical device according to the present embodiment.

FIG. 15 is a perspective view of an optical device according to the present embodiment.

The optical device may be any one among a mobile phone, a mobile phone, a smart phone, a portable smart device, a digital camera, a laptop computer, a digital broadcast terminal, a personal digital assistants (PDA), a portable multimedia player (PMP). However, the type of the optical device is not limited thereto, and any device for photographing the image or the photograph may be referred to as an optical device.

The optical device may comprise a main body 1. The main body 1 can form the appearance of an optical device. The main body 1 can accommodate the camera module 3. The display unit 2 may be disposed on one side of the main body 1. For example, the display unit 2 and the camera module 3 are disposed on one surface of the main body 1, and the camera module 3 is further disposed on the other surface (a surface located at the opposite side of one surface) of the main body 1.

The optical device may comprise a display unit 2. The display unit 2 may be disposed on one side of the main body 1. The display unit 2 can output the image photographed by the camera module 3.

The optical device may comprise a camera module 3. The camera module 3 may be disposed in the main body 1. At least a part of the camera module 3 can be accommodated inside the main body 1. A plurality of camera modules 3 may be provided. The camera module 3 can be disposed on one surface of the main body 1 and on the other surface of the main body 1, respectively. The camera module 3 can take an image of a subject. In this embodiment, a dual camera module may be applied to the camera module 3 of the optical device.

Hereinafter, the configuration of a dual camera module according to the present embodiment will be described with reference to the drawings.

Figure 1:
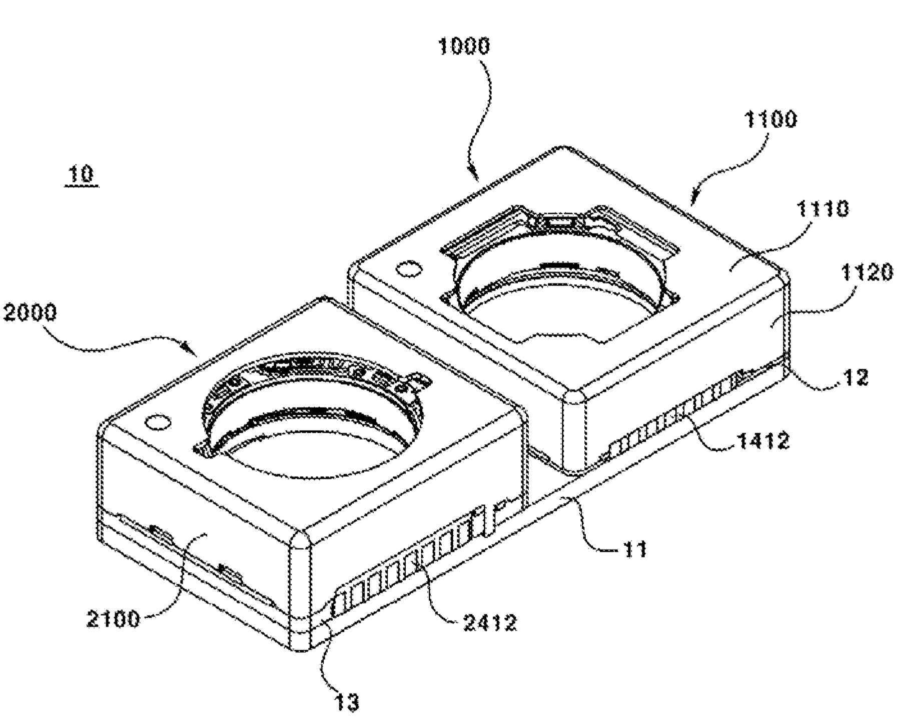
FIG. 1 is a perspective view illustrating a dual camera module according to the present embodiment.

FIG. 1 is a perspective view illustrating a dual camera module according to the present embodiment.

The dual camera module may comprise a first camera module and a second camera module. The dual camera module may comprise a first lens driving device 1000 and a second lens driving device 2000. The first camera module may comprise a first lens driving device 1000. The second camera module may comprise a second lens driving device 2000. In this embodiment, each of the first and second lens driving devices 1000 and 2000 may perform an autofocus function and/or a camera shake correction function. That is, in this embodiment, the first and second lens driving devices 1000 and 2000 may be an 'optical image stabilization module (OIS module)', an 'OIS actuator', or an 'AF actuator'. The dual camera module may comprise a first lens driving device 1000 comprising a first surface and a second lens driving device 2000 comprising a second surface facing the first surface. The first surface may be one surface of the cover 1100 of the first lens driving device 1000 which will be described later and the second surface may be a surface of the cover 2100 of the second lens driving device 2000 which will be described later. The dual camera module may comprise a first and a second lens driving devices 1000 and 2000 arranged side by side on the printed circuit board 11. In another embodiment, the printed circuit board 11 may be separated so that the first lens driving device 1000 is disposed on the first printed circuit board and the second lens driving device 2000 is disposed on the second printed circuit board.

The dual camera module may comprise a lens module. The lens module may comprise at least one lens. The lens module may comprise a lens and a barrel. The lens module may comprise a first lens module coupled to the first lens driving device 1000 and a second lens module coupled to the second lens driving device 2000. The first lens module may be coupled to the bobbin 1210 of the first lens driving device 1000. The first lens module may be coupled to the bobbin 1210 by screws and/or adhesives. The first lens module can be moved integrally with the bobbin 1210. The second lens module may be coupled to the bobbin 2210 of the second lens driving device 2000. The second lens module may be coupled to the bobbin 2210 by screws and/or adhesives. The second lens module can be moved integrally with the bobbin 1210.

The dual camera module may comprise a filter. The filter may comprise an infrared filter. The infrared filter can block the light of the infrared region from entering into the image sensor. An infrared filter may be disposed between the lens module and the image sensor. The infrared filter comprises a first infrared filter disposed below the lens coupled to the first lens driving device 1000 and a second infrared filter disposed below the lens coupled to the second lens driving device 2000. For example, the infrared filter may be disposed in the sensor bases 12 and 13. In another example, an infrared filter may be disposed in bases 1430 and 2430.

The dual camera module may comprise a printed circuit board 11. The first lens driving device 1000 and the second lens driving device 2000 may be disposed on the printed circuit board 11. At this time, the first sensor base 12 may be disposed between the printed circuit board 11 and the first lens driving device 1000. A second sensor base 13 may be disposed between the printed circuit board 11 and the second lens driving device 2000. The printed circuit board 11 may be electrically connected to the first and second lens driving devices 1000 and 2000. An image sensor may be disposed on the printed circuit board 11. The printed circuit board 11 may be electrically connected to the image sensor.

The dual camera module may comprise an image sensor. The image sensor may be disposed on the printed circuit board 11. The image sensor can be electrically connected to the printed circuit board 11. In one example, the image sensor may be coupled to the printed circuit board 11 by surface mounting technology (SMT). As another example, the image sensor may be coupled to the printed circuit board 11 by a flip chip technique. The image sensor comprises a first image sensor disposed on the lower side of the lens coupled to the first lens driving device 1000 and a second image sensor disposed on the lower side of the lens coupled to the second lens driving device 2000. The image sensor can be disposed so that the lens and the optical axis coincide. That is, the optical axis of the image sensor and the optical axis of the lens can be aligned. The image sensor can convert the light irradiated to the effective image area of the image sensor into an electrical signal. The image sensor may be any one among a charge coupled device (CCD), a metal oxide semiconductor (MOS), a CPD, and a CID.

The dual camera module may comprise a control unit. The control unit may be disposed on the printed circuit board 11. The control unit can individually control the direction, intensity, and amplitude of the current supplied to a first coil 1220 and a second coil 1422 of the first lens driving device 1000. The control unit can individually control the direction, intensity, and amplitude of the current supplied to a first coil 2220 and a second coil 2422 of the second lens driving device 2000. The control unit may control the first and second lens driving devices 1000 and 2000 to perform the autofocus function and/or the camera shake correction function. Further, the control unit may perform autofocus feedback control and/or camera shake correction feedback control for the first and second lens driving devices 1000 and 2000.

Hereinafter, the configuration of the first lens driving device will be described with reference to the drawings.

Figure 2:
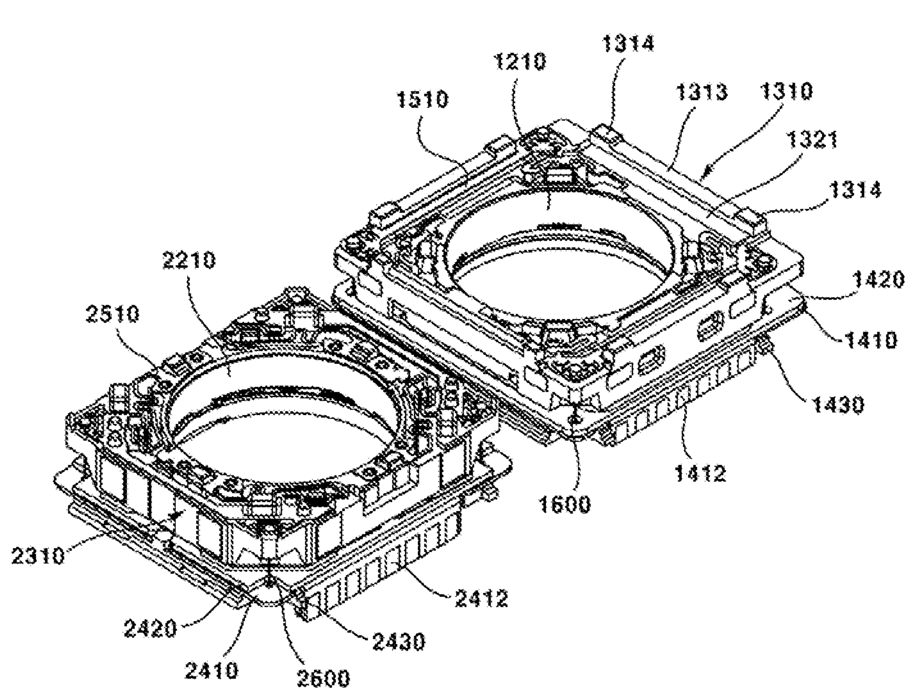
FIG. 2 is a perspective view illustrating a state in which the cover of each of the first lens driving device and the second lens driving device according to the present embodiment is removed.
Figure 3:
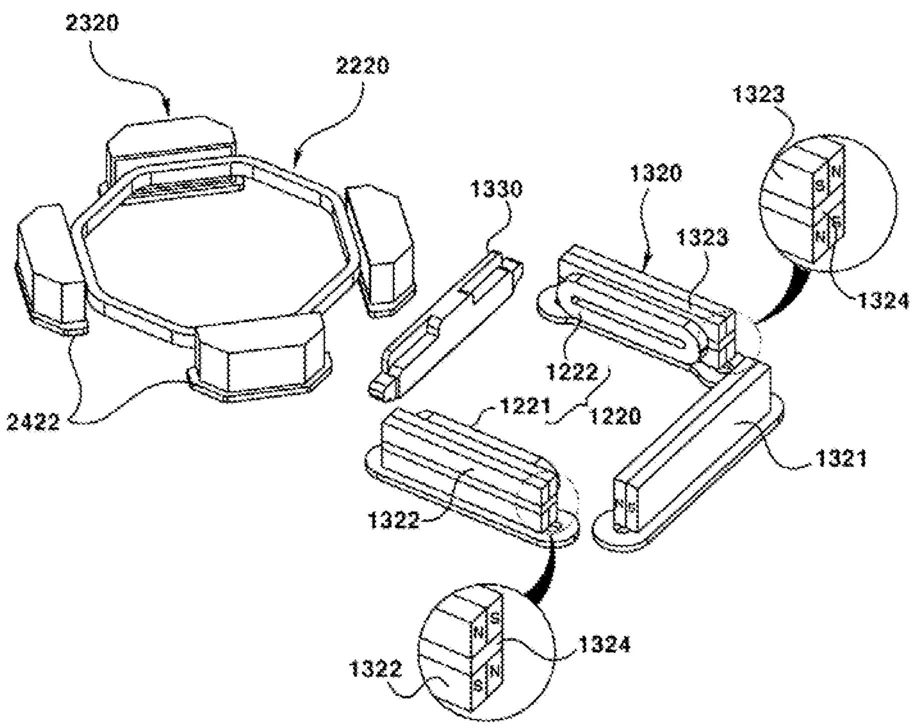
FIG. 3 is a perspective view illustrating the arrangement structure of magnets, coils, and dummy members of each of the first lens driving device and the second lens driving device according to the present embodiment.
Figure 5:
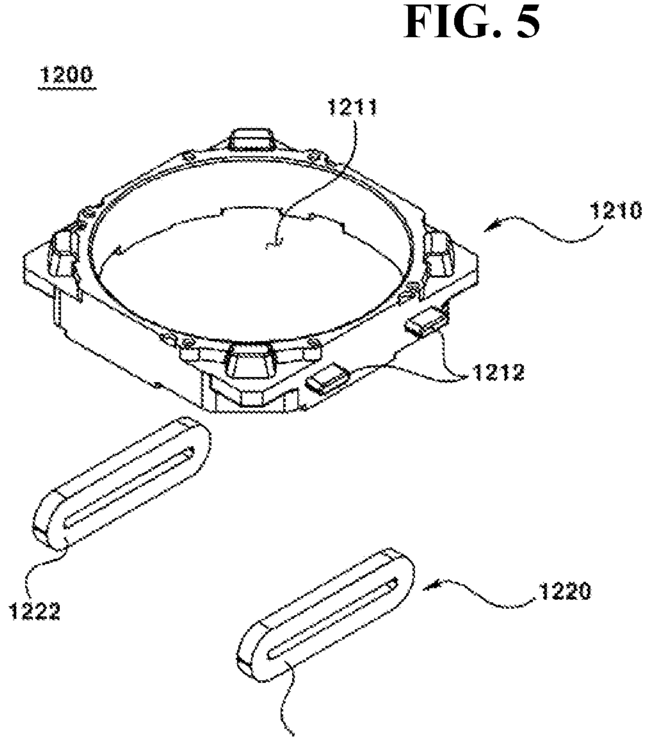
FIG. 5 is an exploded perspective view of the first mover of the first lens driving device according to the present embodiment.
Figure 6:
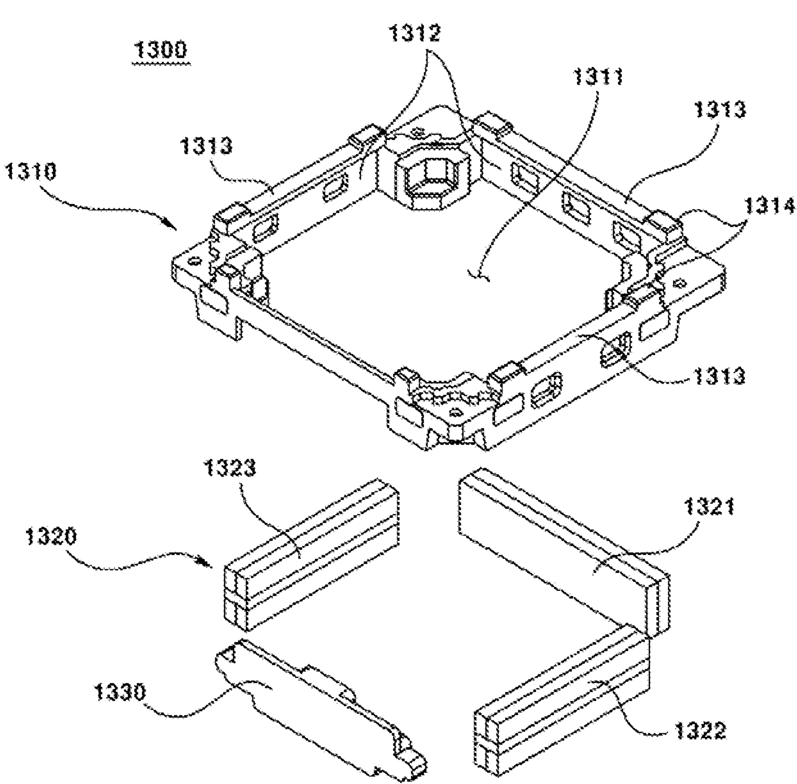
FIG. 6 is an exploded perspective view of the second mover of the first lens driving device according to the present embodiment.
Figure 7:
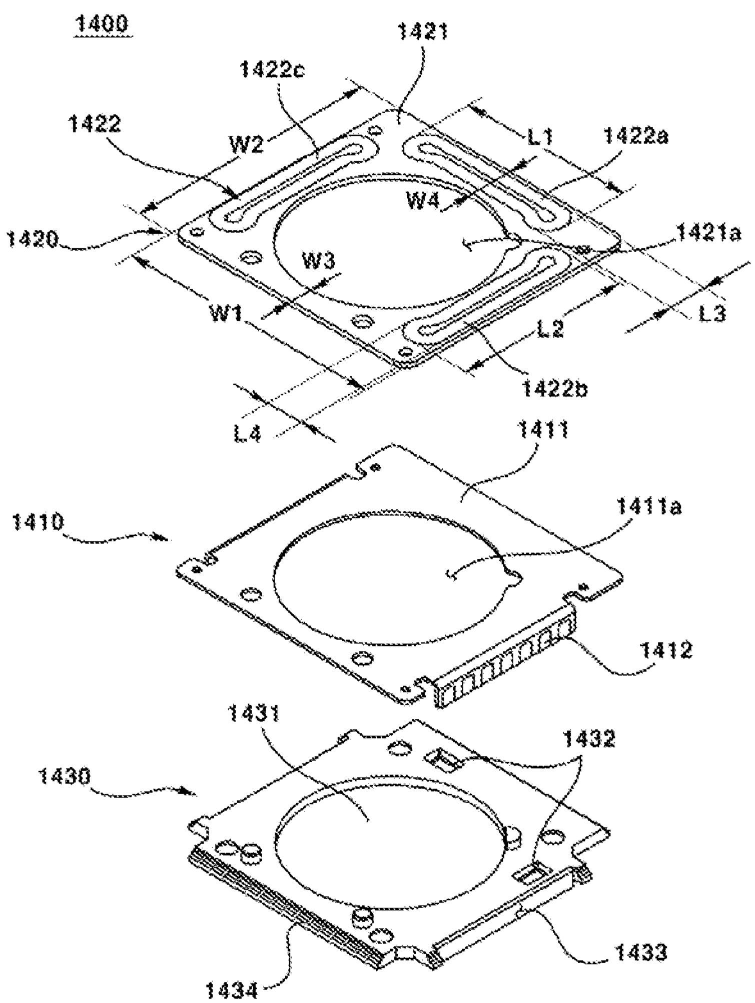
FIG. 7 is an exploded perspective view of the stator of the first lens driving device according to the present embodiment.
Figure 8:
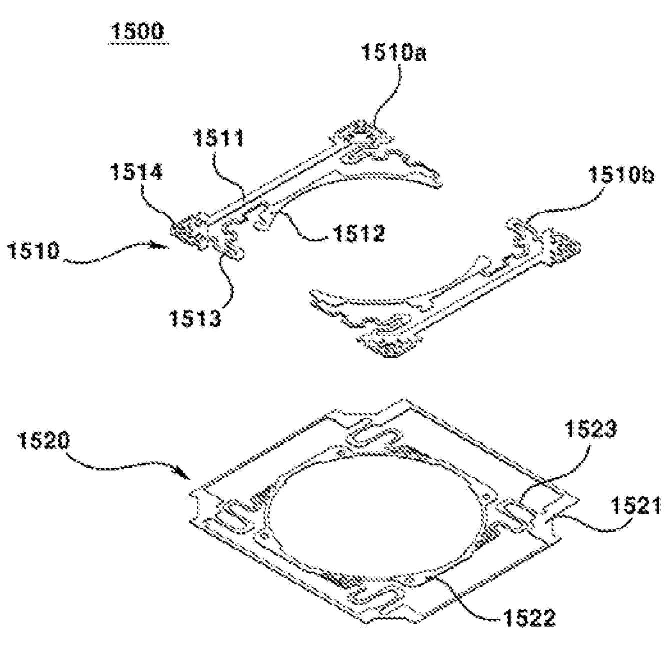
FIG. 8 is an exploded perspective view of the elastic member of the first lens driving device according to the present embodiment.
Figure 9:
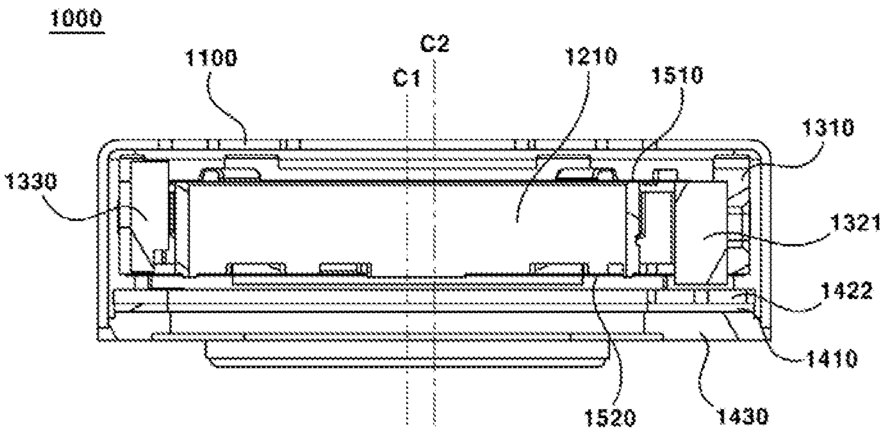
FIG. 9 is a cross-sectional view of the first lens driving device according to the present embodiment.
Figure 10:
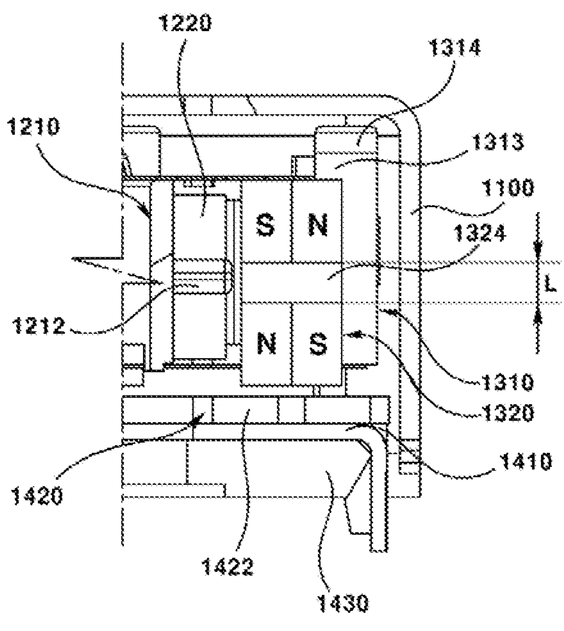
FIG. 10 is a cross-sectional view of a part of the first lens driving device according to the present embodiment.
Figure 11:
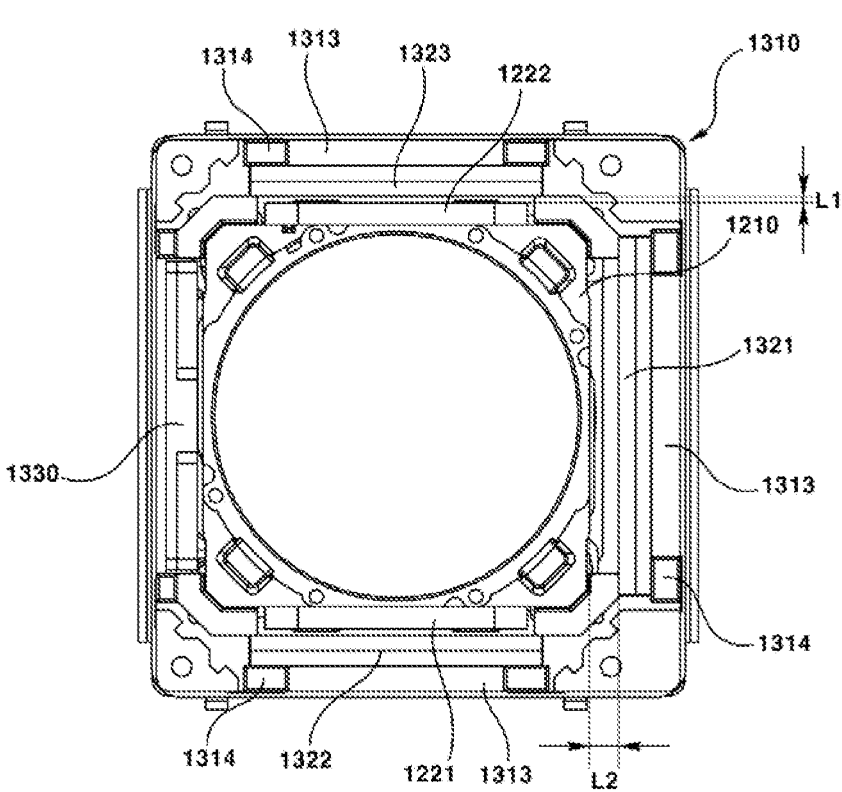
FIG. 11 is a plan view of a part of the first lens driving device according to the present embodiment.
Figure 13:
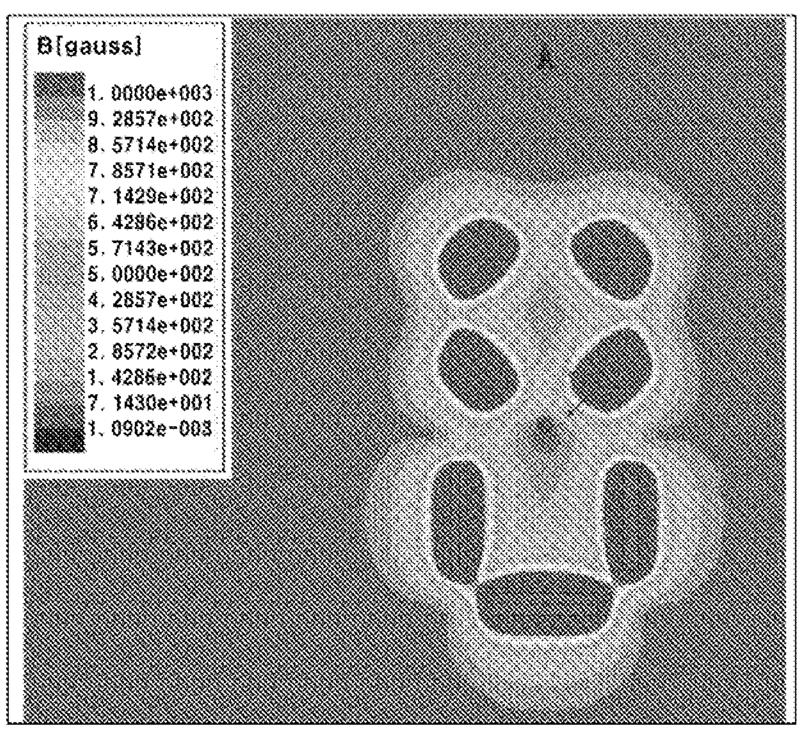
FIG. 13 is a diagram illustrating a magnetic field distribution of a magnet of a dual camera module according to a comparative example.
Figure 14:
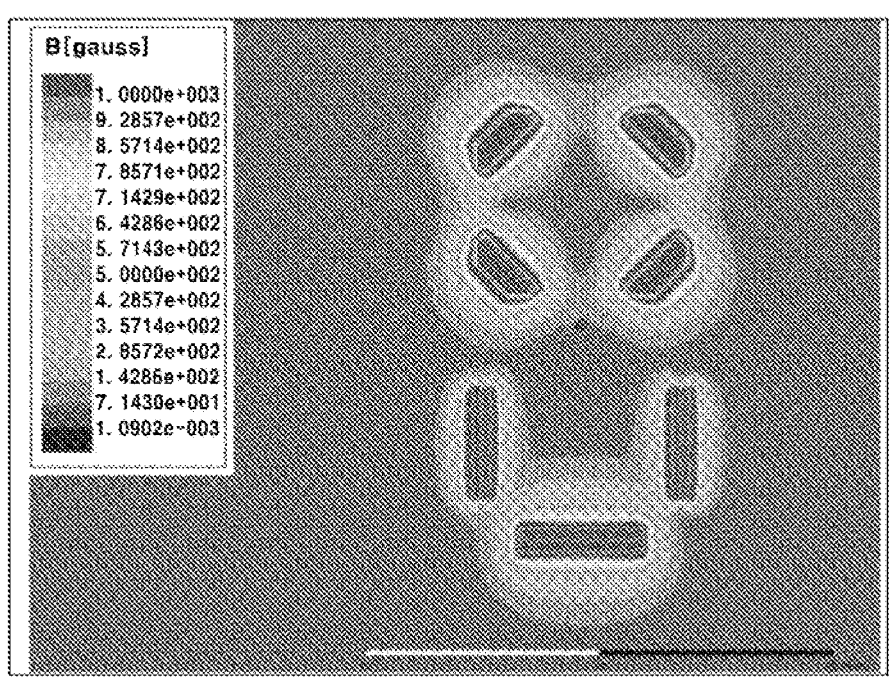
FIG. 14 is a diagram illustrating the magnetic field distribution of the magnet of the dual camera module according to the present embodiment.

FIG. 2 is a perspective view illustrating a state in which the cover of each of the first lens driving device and the second lens driving device according to the present embodiment is removed; FIG. 3 is a perspective view illustrating the arrangement structure of magnets, coils, and dummy members of each of the first lens driving device and the second lens driving device according to the present embodiment; FIG. 4 is an exploded perspective view of the first lens driving device according to the present embodiment; FIG. 5 is an exploded perspective view of the first mover of the first lens driving device according to the present embodiment; FIG. 6 is an exploded perspective view of the second mover of the first lens driving device according to the present embodiment; FIG. 7 is an exploded perspective view of the stator of the first lens driving device according to the present embodiment; FIG. 8 is an exploded perspective view of the elastic member of the first lens driving device according to the present embodiment; FIG. 9 is a cross-sectional view of the first lens driving device according to the present embodiment; FIG. 10 is a cross-sectional view of a part of the first lens driving device according to the present embodiment; FIG. 11 is a plan view of a part of the first lens driving device according to the present embodiment; FIG. 13 is a diagram illustrating a magnetic field distribution of a magnet of a dual camera module according to a comparative example; and FIG. 14 is a diagram illustrating the magnetic field distribution of the magnet of the dual camera module according to the present embodiment.

The first lens driving device 1000 may be a voice coil motor (VCM). Further, the first lens driving device 1000 may be an OIS, and may be an OIS for Dual OIS.

The first lens driving device 1000 may comprise a cover 1100. The cover 1100 can be coupled to the base 1430. The cover 1100 can accommodate a housing 1310 inside. The cover 1100 may form the appearance of the first lens driving device 1000. The cover 1100 may be in the form of a hexahedron with a lower surface opened. The cover 1100 may be a non-magnetic material. The cover 1100 may be formed of a metal material. The cover 1100 may be formed of a metal plate. The cover 1100 may be connected to the ground portion of the printed circuit board 11. Through this, the cover 1100 can be grounded. The cover 1100 may shield electromagnetic interference (EMI). At this time, the cover 1100 may be referred to as an EMI shield can.

The cover 1100 may comprise an upper plate 1110 and a side plate 1120. The cover 1100 may comprise an upper plate 1110 and a side plate 1120 extending downward from an outer periphery or edge of the upper plate 1110. The lower end of the side plate 1120 of the cover 1100 may be disposed at a stepped portion 1434 of the base 1430. The inner surface of the side plate 1120 of the cover 1100 can be coupled to the base 1430 by an adhesive.

The upper plate 1110 of the cover 1100 may comprise a hole 1111. The hole 1111 may be formed in the upper plate 1110 of the cover 1100. The hole 1111 can expose the lens upward. The hole 1111 may be formed in a size and shape corresponding to the lens. The size of the hole 1111 may be larger than the diameter of the lens module so that the lens module can be inserted and assembled through the hole 1111. The light introduced through the hole 1111 can pass through the lens. At this time, the light passing through the lens can be converted into an electrical signal in the image sensor and can be obtained as an image.

The first lens driving device 1000 may comprise a first mover 1200. The first mover 1200 can be coupled to the lens. The first mover 1200 can be coupled to a second mover 1300 through an elastic member 1500. The first mover 1200 can be moved through the interaction with the second mover 1300. At this time, the first mover 1200 can be moved integrally with the lens. On the other hand, the first mover 1200 can be moved during AF driving. At this time, the first mover 1200 may be referred to as an 'AF mover'. However, the first mover 1200 can be moved even during OIS driving.

The first mover 1200 may comprise a bobbin 1210. The bobbin 1210 may be disposed in or on the inside of the housing 1310. The bobbin 1210 may be disposed in a hole 1311 of the housing 1310. The bobbin 1210 may be movably coupled to the housing 1310. The bobbin 1210 can be moved in the direction of the optical axis with respect to the housing 1310. A lens may be coupled to the bobbin 1210. The bobbin 1210 and the lens may be coupled by a screw-coupling and/or an adhesive. The first coil 1220 may be coupled to the bobbin 1210. An upper elastic member 1510 may be coupled to the upper part or upper surface of the bobbin 1210. A lower elastic member 1520 may be coupled to the lower part or lower surface of the bobbin 1210. The bobbin 1210 may be coupled to the elastic member 1500 by thermal welding and/or an adhesive. The adhesive for coupling the bobbin 1210 and the lens and the bobbin 1210 and the elastic member 1500 may be an epoxy which is cured by at least one among ultraviolet (UV), heat, and laser.

The bobbin 1210 may comprise a hole 1211. The hole 1211 can penetrate the bobbin 1210 in the optical axis direction. The lens module can be accommodated in the hole 1211. For example, a thread corresponding to a thread formed on the outer circumferential surface of the lens module may be formed on the inner circumferential surface of the bobbin 1210 forming the hole 1211.

The bobbin 1210 may comprise a protrusion 1212. The protrusion 1212 may be disposed on the side surface of the bobbin 1210. The protrusion 1212 may protrude from the side surface of the bobbin 1210 and may be integrally formed. The first coil 1220 may be wound on the protrusion 1212. Alternatively, the first coil 1220 already wound on the protrusion 1212 can be coupled. The protrusion 1212 may comprise a first protrusion 1212 and a second protrusion. The bobbin 1210 may comprise the first protrusion 1212 disposed on a first side surface of the bobbin 1210 and the second protrusion disposed on a second side surface disposed at the opposite side of the first side surface of the bobbin 1210. Each of the first protrusion 1212 and the second protrusion may be divided into two protrusions. Alternatively, each of the first protrusion 1212 and the second protrusion may be formed in a straight line without being separated. The first protrusion 1212 can be wound with a first coil unit 1221. The second protrusion may be wound with a second coil unit 1222.

The first mover 1200 may comprise a first coil 1220. The first coil 1220 may be disposed on the bobbin 1210. The first coil 1220 may be disposed between the bobbin 1210 and the housing 1310. The first coil 1220 may be disposed on the outer circumferential surface of the bobbin 1210. The first coil 1220 may be wound directly on the bobbin 1210. The first coil 1220 may face a magnet 1320. The first coil 1220 can be electromagnetically interacted with the magnet 1320. In this case, when an electric current is supplied to the first coil 1220 and an electromagnetic field is formed around the first coil 1220, electromagnetic interaction between the first coil 1220 and the magnet 1320 causes the first coil 1220 to be moved with respect to the magnet 1320. The first coil 1220 may be a single coil formed integrally.

The first coil 1220 may comprise two end portions for supplying power. At this time, one end portion of the first coil 1220 is coupled to a first upper elastic unit **1510*a* and the other end portion of the first coil 1220 may be coupled to a second upper elastic unit 1510*b*. That is, the first coil 1220 can be electrically connected to the upper elastic member 1510. In detail, the first coil 1220 can be supplied with power sequentially via the printed circuit board 11, a substrate 1410, a support member 1600, and the upper elastic member 1510. As a modified embodiment, the first coil 1220 may be electrically connected to the lower elastic member 1520**.

The first coil 1220 may comprise a first coil unit 1221 and a second coil unit 1222 which are spaced apart from each other. The first coil 1220 may comprise a first coil unit 1221 facing a second magnet unit 1322 and a second coil unit 1222 facing a third magnet unit 1323. The first coil unit 1221 and the second coil unit 1222 may be disposed spaced apart from each other on the opposite side of the outer side surface of the bobbin 1210. The first coil unit 1221 may be wound around the first protrusion 1212 so as to surround the upper surface and the lower surface of the first protrusion 1212. The first coil unit 1221 may be inserted into the first protrusion 1212 and the second coil unit 1222 may be inserted into the second protrusion. The second coil unit 1222 can be wound on the second protrusion to surround the upper surface and the lower surface of the second protrusion. The first coil unit 1221 and the second coil unit 1222 may be referred to as a 'spectacle coil'. The first coil unit 1221 and the second coil unit 1222 may have a shape of at least one among elliptical shape, a track shape, and a closed curve shape.

The first coil 1220 may not face the first magnet unit 1321 of the magnet 1320. More in detail, the first coil 1220 faces only the second magnet unit 1322 and the third magnet unit 1323 of the magnet 1320, but may not face the first magnet unit 1321. The first coil unit 1221 is disposed so as to face the second magnet unit 1322 while the second coil unit 1222 is disposed so as to face the third magnet unit 1323, however, any sub-structure of the first coil 1220 facing the first magnet unit 1321, may not be disposed.

The first coil 1220 may comprise a connecting portion (not shown) for electrically connecting the first coil unit 1221 and the second coil unit 1222. The connecting portion of the first coil 1220 may be a connecting coil (not shown). One end of the first coil unit 1221 and one end of the second coil unit 1222 may be connected to the connecting portion of the first coil 1220. The connecting portion of the first coil 1220 may be disposed between the first coil unit 1221 and the second coil unit 1222. The connecting portion of the first coil 1220 may face the first magnet unit 1321. In other embodiments, the connecting portion of the first coil 1220 may face a dummy member 1330. The connecting portion of the first coil 1220 may be disposed between the first magnet unit 1321 and the bobbin 1210 or between the dummy member 1330 and the bobbin 1210.

The distance between the first coil unit 1221 and the second magnet unit 1322 and/or the distance between the second coil unit 1222 and the third magnet unit 1323 (refer to L1 in FIG. 11) may be 60 μm to 150 μm. The distance between the bobbin 1210 and the first magnet unit 1321 (refer to L2 in FIG. 11) may be 60 μm to 200 μm.

The first lens driving device 1000 may comprise a second mover 1300. The second mover 1300 may be movably coupled to the stator 1400 via a support member 1600. The second mover 1300 can support the first mover 1200 through the elastic member 1500. The second mover 1300 can move the first mover 1200 or can be moved with the first mover 1200. The second mover 1300 can be moved through interaction with the stator 1400. The second mover 1300 can be moved during OIS driving. At this time, the second mover 1300 may be referred to as an 'OIS mover'. The second mover 1300 can be moved integrally with the first mover 1200 during OIS driving.

The second mover 1300 may comprise a housing 1310. The housing 1310 may be disposed outside the bobbin 1210. The housing 1310 can accommodate at least a portion of the bobbin 1210 either inside or inner side thereof. The housing 1310 may be disposed inside (inner side) the cover 1100. The housing 1310 may be disposed between the cover 1100 and the bobbin 1210. The housing 1310 may be formed of a material different from that of the cover 1100. The housing 1310 may be formed of an insulating material. The housing 1310 may be formed of an injection molded material. The outer side surface of the housing 1310 may be spaced apart from the inner surface of the side plate 1120 of the cover 1100. The housing 1310 can be moved for OIS driving through the separating space between the housing 1310 and the cover 1100. The magnet 1320 may be disposed in the housing 1310. The housing 1310 and the magnet 1320 may be coupled together by an adhesive. The upper elastic member 1510 may be coupled to the upper portion or upper surface of the housing 1310. The lower elastic member 1520 may be coupled to the upper portion or lower surface of the housing 1310. The housing 1310 may be coupled to the elastic member 1500 by thermal welding and/or adhesive. The adhesive for coupling the housing 1310 and the magnet 1320, and the housing 1310 and the elastic member 1500 may be an epoxy that is cured by one or more among ultraviolet (UV), heat, and laser.

The housing 1310 may comprise four side parts and four corner portions disposed between the four side parts. The housing 1310 may comprise a first side part disposed on the first surface side of the first lens driving device 1000, a second side part disposed on the opposite side of the first side part, and a third side part and a fourth side part disposed between the first side part and the second side part that are disposed at the opposite side from each other. The first side part of the housing 1310 may be disposed on the first surface side of the first lens driving device 1000. The housing 1310 may comprise four side parts, and the four side parts may optionally be referred to as a 'first side part' to a 'fourth side part' to distinguish one another. For example, the second side part may be disposed on the first surface side of the first lens driving device 1000, unlike the previous description.

The housing 1310 may comprise a hole 1311. The hole 1311 may be formed in the housing 1310. The hole 1311 may be formed to penetrate the housing 1310 in the optical axis direction. A bobbin 1210 may be disposed in the hole 1311. The hole 1311 may be formed in a shape corresponding to the bobbin 1210 at least in part. The inner circumferential surface of the housing 1310 forming the hole 1311 may be spaced apart from the outer circumferential surface of the bobbin 1210. However, the housing 1310 and the bobbin 1210 may be overlapped with each other in the direction of the optical axis at least in part to limit the moving stroke distance of the bobbin 1210 in the optical axis direction.

The housing 1310 may comprise a magnet coupling portion 1312. A magnet 1320 may be coupled to the magnet coupling portion 1312. The magnet coupling portion 1312 may comprise an accommodating groove formed by recessing a portion of the inner circumferential surface and/or the lower surface of the housing 1310. The magnet coupling portion 1312 may be formed on each of the four side parts of the housing 1310. As a modified embodiment, the magnet coupling portion 1312 may be formed at each of the four corners of the housing 1310.

The housing 1310 may comprise an upper plate 1313. The housing 1310 may comprise an upper plate 1313 disposed above the upper surface of the magnet 1320. The upper plate 1313 can support the upper surface of the magnet 1320. An adhesive may be disposed between the upper plate 1313 and the magnet 1320. The upper plate 1313 may be disposed at the upper side of a portion of the upper surface of the magnet 1320. The stoppers 1314 protruding toward the upper plate 1110 of the cover 1100 may be disposed on the upper plate 1313. The upper plate 1313 may be integrally formed with the housing 1310. The stoppers 1314 may be integrally formed with the upper plate 1313. The upper plate 1313 may be disposed on the second side part, the third side part and the fourth side part of the housing 1310, respectively. That is, three upper plates 1313 can be disposed in the housing 1310. The upper plate 1313 may not be disposed on the first side part of the housing 1310 where the dummy member 1330 is disposed. The upper plate 1313 of the housing 1310 may be disposed on each of the second side part, the third side part and the fourth side part of the housing 1310, but not be disposed on the first side part of the housing 1310. That is, the upper plate 1313 of the housing 1310 may not be disposed on the upper portion of the dummy member 1330 disposed on the first side part of the housing 1310. That is, the housing 1310 may be asymmetric with respect to the center axis of the lens coupled to the bobbin 1210.

The housing 1310 may comprise stoppers 1314. The stoppers 1314 may be disposed on the upper plate 1313. The stoppers 1314 may be integrally formed with the upper plate 1313. Two stoppers 1314 may be provided for each upper plate 1313. That is, a total of six stoppers 1314 may be disposed in the housing 1310. The two stoppers 1314 may be disposed at both ends of the upper plate 1313, respectively. The upper surface of the stoppers 1314 may form the upper end of the housing 1310. The stoppers 1314 may be overlapped with the upper plate 1110 of the cover 1100 in the optical axis direction. That is, when the housing 1310 continues to move upward, the upper surface of the stoppers 1314 comes into contact with the upper plate 1110 of the cover 1100. Therefore, the stoppers 1314 can limit the upward moving distance of the housing 1310.

The second mover 1300 may comprise a magnet 1320. The magnet 1320 may be disposed in the housing 1310. The magnet 1320 may be fixed to the housing 1310 by an adhesive. The magnet 1320 may be disposed between the bobbin 1210 and the housing 1310. The magnet 1320 may face the first coil 1220. The magnet 1320 may be electromagnetically interacted with the first coil 1220. The magnet 1320 may face the second coil 1422. The magnet 1320 may be electromagnetically interacted with the second coil 1422. The magnet 1320 can be commonly used for AF driving and OIS driving. The magnet 1320 may be disposed on the side part of the housing 1310. At this time, the magnet 1320 may be a flat plate magnet having a flat plate shape. As a modified embodiment, the magnet 1320 may be disposed at corner portions of the housing 1310. At this time, the magnet 1320 may be a corner magnet having an inner side surface of a hexahedron shape wider than the outer side surface.

In this embodiment, the upper surface of the magnet 1320 may comprise a first portion being overlapped with the upper elastic member 1510 in the optical axis direction. The first portion of the upper surface of the magnet 1320 may not be overlapped with the housing 1310 in the direction of the optical axis. The first portion of the upper surface of the magnet 1320 may be exposed from the housing 1310 so as to face the upper elastic member 1510. The first portion of the upper surface of the magnet 1320 may be in contact with the upper elastic member 1510. The upper surface of the magnet 1320 may comprise a second portion that is overlapped with the housing 1310 in the optical axis direction. The upper plate 1313 of the housing 1310 may be disposed above the second portion of the upper surface of the magnet 1320. The second portion of the upper surface of the magnet 1320 may be coupled with the upper plate 1313 of the housing 1310. The second portion of the upper surface of the magnet 1320 may not be overlapped with the upper elastic member 1510 in the direction of the optical axis. The upper surface of the magnet 1320 may further comprise a third portion not being overlapped with the housing 1310 and the upper elastic member 1510 in the direction of the optical axis. That is, the upper surface of the magnet 1320 may comprise a first portion being overlapped with the upper elastic member 1510 in the direction of the optical axis, a second portion being overlapped with the upper plate 1313 of the housing 1310, and a third portion not being overlapped with all of the upper elastic member 1510 and the upper plate 1313 of the housing 1310. However, the third portion may not exist.

In this embodiment, the upper surface of the magnet 1320 may be disposed on the same plane as the upper surface of the housing 1310 to which the upper elastic member 1510 is coupled. For this structure, a part of the housing 1310 may be omitted in this embodiment. That is, the structure can be described as a part of the housing 1310 is omitted and the upper elastic member 1510 is disposed at the corresponding part. A portion of the upper surface of the magnet 1320 may be in contact with the upper elastic member 1510. Further, another portion of the upper surface of the magnet 1320 may be in contact with the upper plate 1313 of the housing 1310.

The magnets 1320 may comprise a plurality of magnets that are spaced apart from each other. The magnets 1320 may comprise three magnets that are spaced apart from each other. The magnet 1320 may comprise first to third magnet units 1321, 1322, and 1323. The magnet 1320 comprises a first magnet unit 1321 disposed on the second side part of the housing 1310, a second magnet unit 1322 disposed on the third side part of the housing 1310, and a third magnet unit 1323 disposed on the fourth side part. The first magnet unit 1321 may face a first coil unit 1422*a* of the second coil 1422. The second magnet unit 1322 may face the first coil unit 1221 of the first coil 1220 and may face a second coil unit 1422*b* of the second coil 1422. The third magnet unit 1323 may face the second coil unit 1222 of the first coil 1220 and may face the third coil unit 1422*c* of the second coil 1422. The second magnet unit 1322 and the third magnet unit 1323 can move the bobbin 1210 in the optical axis direction. The first magnet unit 1321, the second magnet unit 1322, and the third magnet unit 1323 can move the housing 1310 in a direction perpendicular to the optical axis direction.

The first magnet unit 1321 may be a 2-pole magnet. In this embodiment, the second magnet unit 1322 and the third magnet unit 1323 may be 4-pole magnets. The 2-pole magnet may be a 2-pole magnetized magnet, and the 4-pole magnet may be a 4-pole magnetized magnet. Due to this, in the present embodiment, the magnetic interference between the magnets 1320 of the first lens driving device 1000 and the magnets 2320 of the second lens driving device 2000 can be reduced. In the comparative example, the second magnet unit 1322 and the third magnet unit 1323 are provided as 2-pole magnets. FIG. 13 is a view illustrating the magnetic field distribution of the comparative example. FIG. 14 is a view illustrating the magnetic field distribution of the present embodiment. Comparing FIG. 14 with FIG. 13, it can be seen that the magnetic interference between the magnet 1320 of the first lens driving device 1000 and the magnet 2320 of the second lens driving device 2000 is reduced or eliminated.

Each of the second magnet unit 1322 and the third magnet unit 1323 may comprise a first surface facing the first coil 1220. The first surface may comprise a neutral portion 1324 that is disposed horizontally in the center portion. The neutral portion 1324 may be a neutral region and may not comprise polarity. The first surface may have a polarity different from that of the upper portion and the lower portion with respect to the neutral portion 1324. That is, the upper side of the neutral portion 1324 may have an S pole, and the lower side of the neutral portion 1324 may have an N pole. As a modified embodiment, the upper side of the neutral portion 1324 may have an N pole, and the lower side of the neutral portion 1324 may have an S pole. The vertical length (refer to L in FIG. 10) of the neutral portion 1324 may be 0.1 mm to 0.5 mm.

Each of the first to third magnet units 1321, 1322, and 1323 may comprise a second surface facing the second coil 1422 and a third surface disposed at the opposite side of the second surface. The second surface may be the inner side which is the center side of the first lens driving device 1000, and the third surface may be the outer side which is the opposite side of the inner side. The second and third surfaces of each of the first to third magnet units 1321, 1322, and 1323 may have different polarities. That is, the second surface may have an N pole and the third surface may have an S pole. As a modified embodiment, the second surface may have an S pole and the third surface may have an N pole.

The second mover 1300 may comprise a dummy member 1330. The dummy member 1330 may be disposed on the first side part of the housing 1310. The dummy member 1330 may comprise a nonmagnetic material. The dummy member 1330 may have a mass corresponding to the first magnet unit 1321. The dummy member 1330 may be disposed at a position corresponding to the first magnet unit 1321 for weight balance. Or, the intensity of the magnetism of the dummy member 1330 may be weaker than the intensity of the magnetism of the first magnet unit 1321. The dummy member 1330 may be disposed on the opposite side of the first magnet unit 1321 in order to center the weight. The dummy member 1330 may be non-magnetic material. The dummy member 1330 may be made of 95% or more of tungsten. That is, the dummy member 1330 may be a tungsten alloy. For example, the specific gravity of the dummy member 1330 may be 18,000 or more. The entire upper surface of the dummy member 1330 may be exposed from the housing 1310. That is, the upper surface of the dummy member 1330 may not be overlapped with or supported by the housing 1310 in the direction of the optical axis. The upper plate 1313 of the housing 1310 may not be disposed above the dummy member 1330. The second coil 1422 may not be disposed between the dummy member 1330 and the substrate 1410.

The dummy member 1330 may include a shape suitable for assembling to the housing 1310. The dummy member 1330 may comprise protrusions being protruded toward both side directions. The dummy member 1330 may comprise a shape for avoiding interference with adjacent operating components. The dummy member 1330 may comprise a groove formed at a portion where the upper surface and the inner surface meet. The length of the outer surface of the dummy member 1330 in the horizontal direction may be shorter than the length in the corresponding direction of the first magnet unit 1321. The thickness of the dummy member 1330 may be corresponding to the thickness of the first magnet unit 1321. Alternatively, the thickness of the dummy member 1330 may be larger or smaller than the thickness of the first magnet unit 1321. The shape of the dummy member 1330 may be different from the shape of the first magnet unit 1321. Alternatively, the shape of the dummy member 1330 may be corresponding to the shape of the first magnet unit 1321. The dummy member 1330 may be disposed at the same height as the first magnet unit 1321. Alternatively, the dummy member 1330 may be disposed higher or lower than the first magnet unit 1321. The upper end of the dummy member 1330 may be disposed at the same height as the upper end of the first magnet unit 1321. Alternatively, the upper end of the dummy member 1330 may be disposed higher or lower than the upper end of the first magnet unit 1321. The lower end of the dummy member 1330 may be disposed at a height corresponding to the lower end of the first magnet unit 1321. Alternatively, the lower end of the dummy member 1330 may be disposed higher or lower than the lower end of the first magnet unit 1321. As illustrated in FIG. 3, the dummy member 1330 may be disposed between the magnet 1320 of the first lens driving device 1000 and the magnet 2320 of the second lens driving device 2000. The horizontal length of the dummy member 1330 may be the same as the horizontal length of the first magnet unit 1321, or may be shorter or longer. The vertical length of the dummy member 1330 may be same as the horizontal length of the first magnet unit 1321, or may be shorter or longer.

The first lens driving device 1000 may comprise a stator 1400. The stator 1400 may be disposed below the first and second movers 1200 and 1300. The stator 1400 can movably support the second movers 1300. The stator 1400 can move the second mover 1300. At this time, the first mover 1200 can be moved together with the second mover 1300.

The stator 1400 may comprise a substrate 1410. The substrate 1410 may comprise a second coil 1422 facing the magnet 1320. Or, the substrate 1410 may comprise a circuit member 1420 that comprises a second coil 1422 facing the magnet 1320. The substrate 1410 may be disposed on a base 1430. The substrate 1410 may be disposed between the housing 1310 and the base 1430. The support member 1600 may be coupled to the substrate 1410. The substrate 1410 can supply power to the second coil 1422. The substrate 1410 may be coupled to the circuit member 1420. The substrate 1410 may be coupled to the second coil 1422. The substrate 1410 may be coupled to the printed circuit board 11 disposed below the base 1430. The substrate 1410 may comprise a flexible printed circuit board (FPCB). The substrate 1410 may be bent at a certain portion.

The substrate 1410 may comprise a body portion 1411. The substrate 1410 may comprise a hole 1411*a* formed in the body portion 1411. The substrate 1410 may comprise a hole 1411*a* corresponding to a lens coupled to the bobbin 1210. The hole 1411*a* may be eccentrically disposed toward the first surface of the first lens driving device 1000. In this embodiment, through such an eccentric arrangement structure of the hole 1411*a*, one or more spaces can be secured among the base 1430, the substrate 1410, and the circuit member 1420 for increasing the number of turns of the first coil unit 1422*a*. The hole 1411*a* of the substrate 1410 is formed closer to one side surface of the substrate 1410. At this time, the one side surface of the substrate 1410 may be adjacent to the dummy member 1330. The shortest distance from the other side surface located at the opposite side of the one side surface of the substrate 1410 to the hole 1411*a* may be larger than the shortest distance from the one side surface to the hole 1411*a*.

The substrate 1410 may comprise a hole 1411*a*, an inner circumferential surface formed by the hole 1411*a*, a first side surface disposed on the first side part of the housing 1310, and a second side surface disposed on the second side part of the housing 1310. The distance between the inner circumferential surface of the substrate 1410 and the second side surface of the substrate 1410 (refer to W4 in FIG. 7) may be larger than the distance between the inner circumferential surface of the substrate 1410 and the first side surface of the substrate 1410 (refer to W3 in FIG. 7). A first coil unit 1422*a* may be disposed between the inner circumferential surface of the substrate 1410 and the second side surface of the substrate 1410. The second coil 1422 may not be disposed between the inner circumferential surface of the substrate 1410 and the first side surface of the substrate 1410.

The substrate 1410 may comprise a first side surface disposed on the first surface side of the first lens driving device 1000, a second side surface disposed on the opposite side of the first side surface, and a third side surface and a fourth side surface disposed between the first side surface and the second side surface and disposed on the opposite side from each other. At this time, the distance between the third side surface and the fourth side surface (refer to W1 in FIG. 7) may be longer than the distance between the first side surface and the second side surface (refer to W2 in FIG. 7). Through the above-mentioned structure of the present embodiment, a space can be secured so that the length L1 of the first coil unit 1422*a* in the lengthwise direction can be formed to be longer than the length L2 of each of the second and third coil units 1422*b* and 1422*c* in the lengthwise direction.

The substrate 1410 may comprise a terminal portion 1412. The terminal portion 1412 may extend from the body portion 1411 of the substrate 1410. The terminal portion 1412 may be formed by bending a part of the substrate 1410 downward. At least a part of the terminal portion 1412 may be exposed to the outside. The terminal portion 1412 may be coupled to the printed circuit board 11 disposed below the base 1430 by soldering. The terminal portion 1412 may be disposed in a terminal accommodating portion 1433 of the base 1430.

The substrate 1410 may comprise a circuit member 1420. The stator 1400 may comprise a circuit member 1420. The circuit member 1420 may be disposed on the base 1430. The circuit member 1420 may be disposed on the substrate 1410. The circuit member 1420 may be disposed between the magnet 1320 and the base 1430. Here, although the circuit member 1420 is described as a separate component from the substrate 1410, the circuit member 1420 can be understood as a component included in the substrate 1410.

The circuit member 1420 may comprise a substrate portion 1421. The substrate portion 1421 may be a circuit board.

The substrate portion 1421 may be an FPCB. The second coil 1422 may be integrally formed with a fine pattern coil (FP coil) on the substrate portion 1421. A hole through which the support member 1600 passes may be formed in the substrate portion 1421. A hole 1421*a* may be formed in the substrate portion 1421. The hole 1421*a* of the substrate portion 1421 may be formed corresponding to the hole 1411*a* of the substrate 1410.

The circuit member 1420 may comprise a second coil 1422. The second coil 1422 may face the magnet 1320. The second coil 1422 can be electromagnetically interacted with the magnet 1320. In this case, when an electric current is supplied to the second coil 1422 and an electromagnetic field is formed around the second coil 1422, electromagnetic coupling between the second coil 1422 and the magnet 1320 causes the second coil 1422 to move with respect to the magnet 1320. The second coil 1422 can move the housing 1310 and the bobbin 1210 in a direction perpendicular to the optical axis with respect to the base 1430 through an electromagnetic interaction with the magnet 1320. The second coil 1422 may be a fine pattern coil (FP coil) formed integrally with the base plate 1421.

The second coil 1422 may comprise a first coil unit 1422*a* facing the first magnet unit 1321, a second coil unit 1422*b* facing the second magnet unit 1322, and a third coil unit 1422*c* facing the third magnet unit 1323. The number of turns of the coil wound in the first coil unit 1422*a* may be greater than the number of turns of the coil wound in the second coil unit 1422*b*. The number of turns of the coil wound in the third coil unit 1422*c* may be corresponding to the number of turns of the coil wound in the second coil unit 1422*b*. In the present embodiment, movement in the X-axis direction during the OIS driving can be performed through the first coil unit 1422*a*, and movement in the Y-axis direction can be performed through the second coil unit 1422*b* and the third coil unit 1422*c*. Therefore, in this embodiment, the number of turns of the first coil unit 1422*a* is made higher than the number of turns of the second coil unit 1422*b* and the third coil unit 1422*c* in order to supplement the insufficient driving force in the X-axis direction. For example, the ratio of the number of turns of the first coil unit 1422*a* to the number of turns of the second coil unit 1422*b* (or the third coil unit 1422*c*) may be 1.5:2.0 to 1:1. This is to compensate for the fact that the second coil 1422 is not disposed at a position facing the first coil unit 1422*a*. That is, the ratio of the number of turns of the first coil unit 1422*a* to the number of turns of the second coil unit 1422*b* (or the third coil unit 1422*c*) can be arranged to 1.5:2.0 due to spatial limitation. The length in the lengthwise direction of the first coil unit 1422*a* (refer to L1 in FIG. 7) is longer than the length in the lengthwise direction of the second coil unit 1422*b* and the third coil unit 1422*c* (refer to L2 in FIG. 7). The length in the widthwise direction of the first coil unit 1422*a* (refer to L3 in FIG. 7) is longer than the widthwise direction (refer to L4 in FIG. 7) of each of the second coil unit 1422*b* and the third coil unit 1422*c*.

In the present embodiment, the center axis (refer to C1 in FIG. 9) of the lens coupled to the bobbin 1210 may be eccentrically disposed toward the direction of the dummy member 1330 from the center axis of the first lens driving device 1000. The center axis C1 of the bobbin 1210 may be disposed eccentrically toward the direction of the dummy member 1330 from the center axis C2 of the housing 1310. At this time, the center axis C1 of the lens can coincide with the center axis C1 of the bobbin 1210 or the center axis of the hole 1311 of the housing 1310. The center axis C2 of the first lens driving device 1000 and the center axis C2 of the housing 1310 may coincide with each other. At this time, the center axis C2 of the housing 1310 may be a center axis viewed with reference to the outer periphery of the housing 1310, not the center axis of the hole 1311 of the housing 1310. Further, the hole 1411*a* may be disposed eccentrically to the first surface side of the first lens driving device 1000. Through the above-mentioned structure of the present embodiment, a space can be secured so that the length L1 of the first coil unit 1422*a* in the lengthwise direction can be formed to be longer than the length L2 of each of the second and third coil units 1422*b* and 1422*c* in the lengthwise direction.

The stator 1400 may comprise a base 1430. The base 1430 may be disposed at the lower side of the housing 1310. The base 1430 may be disposed on the lower side of the substrate 1410. The substrate 1410 may be disposed on the upper surface of the base 1430. The base 1430 can be coupled to the cover 1100. The base 1430 may be disposed on the upper side of the printed circuit board 11.

The base 1430 may comprise a hole 1431. The hole 1431 may be formed in the base 1430. The hole 1431 may be formed to penetrate the base 1430 in the optical axis direction. Light passing through the lens module through the hole 1431 can be incident on the image sensor. That is, light passing through the lens module can be incident on the image sensor through the hole 1421*a* of the circuit member 1420, the hole 1411*a* of the substrate 1410, and the hole 1431 of the base 1430.

The base 1430 may comprise a sensor coupling portion 1432. A second sensor (not shown) may be disposed in the sensor coupling portion 1432. The sensor coupling portion 1432 can accommodate at least a part of the second sensor. The sensor coupling portion 1432 may comprise a groove formed by recessing the upper surface of the base 1430. The sensor coupling portion 1432 may comprise two grooves. At this time, a second sensor is disposed in each of the two grooves so that the movement of the magnet 1320 in the X-axis direction and in the Y-axis direction can be sensed.

The base 1430 may comprise a terminal accommodating portion 1433. A terminal portion 1412 of the substrate 1410 may be disposed in the terminal accommodating portion 1433. The terminal accommodating portion 1433 may comprise a groove formed by inwardly recessing a part of the side surface of the base 1430. The width of the terminal accommodating portion 1433 may be formed to correspond to the width of the terminal portion 1412 of the substrate 1410. The length of the terminal accommodating portion 1433 may be formed corresponding to the length of the terminal portion 1412 of the substrate 1410.

The base 1430 may comprise a stepped portion 1434. The stepped portion 1434 may be formed on the side surface of the base 1430. The stepped portion 1434 can be formed around the outer circumferential surface of the base 1430. The stepped portion 1434 may be formed by recessing the upper portion of the side surface of the base 1430. Alternatively, the stepped portion 1434 may be formed by protruding a lower portion of the side surface of the base 1430. The lower end of the side plate 1120 of the cover 1100 may be disposed on the stepped portion 1434.

The first lens driving device 1000 may comprise an elastic member 1500. The elastic member 1500 can be coupled to the bobbin 1210 and the housing 1310. The elastic member 1500 can elastically support the bobbin 1210. The elastic member 1500 may have elasticity at least in part. The elastic member 1500 can movably support the bobbin 1210. The elastic member 1500 can support the movement of the bobbin 1210 during AF driving. At this time, the elastic member 1500 may be referred to as an 'AF supporting member'.

The elastic member 1500 may comprise an upper elastic member 1510. The upper elastic member 1510 may be disposed on the upper side of the bobbin 1210. The upper elastic member 1510 may be coupled to the bobbin 1210 and the housing 1310. The upper elastic member 1510 may be coupled to the upper surface of the bobbin 1210. The upper elastic member 1510 may be coupled to the upper surface of the housing 1310. The upper elastic member 1510 may be coupled with the support member 1600. The upper elastic member 1510 may be formed of a plate spring.

The upper elastic member 1510 may be used as a conductive line for supplying electricity to the first coil 1220. The upper elastic member 1510 may comprise a first upper elastic unit 1510*a* and a second upper elastic unit 1510*b* that are spaced apart from each other. The first upper elastic unit 1510*a* may be coupled to one end of the first coil 1220 and the second upper elastic unit 1510*b* may be coupled to the other end of the first coil 1220. The upper elastic member 1510 and the first coil 1220 may be coupled by soldering.

The upper elastic member 1510 may comprise an outer side portion 1511. The outer side portion 1511 may be coupled to the housing 1310. The outer side portion 1511 may be coupled to the upper surface of the housing 1310. The outer side portion 1511 may comprise a hole or groove coupled to the protrusion of the housing 1310. The outer side portion 1511 may be fixed to the housing 1310 by an adhesive.

The upper elastic member 1510 may comprise an inner side portion 1512. The inner side portion 1512 can be coupled to the bobbin 1210. The inner side portion 1512 can be coupled to the upper surface of the bobbin 1210. The inner side portion 1512 may comprise a hole or groove coupled to a protrusion of the bobbin 1210. The inner side portion 1512 can be fixed to the bobbin 1210 by an adhesive.

The upper elastic member 1510 may comprise a connecting portion 1513. The connecting portion 1513 can connect the outer side portion 1511 and the inner side portion 1512. The connecting portion 1513 can elastically connect the outer side portion 1511 and the inner side portion 1512. The connecting portion 1513 may have elasticity. At this time, the connecting portion 1513 may be referred to as an 'elastic portion'. The connecting portion 1513 may be formed by bending two or more times.

The upper elastic member 1510 may comprise a coupling portion 1514. The coupling portion 1514 can be coupled with the support member 1600. The coupling portion 1514 may be coupled to the support member 1600 by soldering. The coupling portion 1514 may comprise a hole or groove coupled with the support member 1600. The coupling portion 1514 may extend from the outer side portion 1511. The coupling portion 1514 may comprise a bent portion formed by being bent.

The elastic member 1500 may comprise a lower elastic member 1520. The lower elastic member 1520 may be disposed on the lower side of the bobbin 1210. The lower elastic member 1520 may be coupled to the bobbin 1210 and the housing 1310. The lower elastic member 1520 can be coupled to the lower surface of the bobbin 1210. The lower elastic member 1520 can be coupled to the lower surface of the housing 1310. The lower elastic member 1520 may be formed of a plate spring. The lower elastic member 1520 may be integrally formed.

The lower elastic member 1520 may comprise an outer side portion 1521. The outer side portion 1521 can be coupled to the housing 1310. The outer side portion 1521 may be coupled to the lower surface of the housing 1310. The outer side portion 1521 may comprise a hole or groove coupled to the protrusion of the housing 1310. The outer side portion 1521 can be fixed to the housing 1310 by an adhesive.

The lower elastic member 1520 may comprise an inner side portion 1522. The inner side portion 1522 can be coupled to the bobbin 1210. The inner side portion 1522 can be coupled to the lower surface of the bobbin 1210. The inner side portion 1522 may comprise a hole or groove coupled to the protrusion of the bobbin 1210. The inner side portion 1522 can be fixed to the bobbin 1210 by an adhesive.

The lower elastic member 1520 may comprise a connecting portion 1523. The connecting portion 1523 can connect the outer side portion 1521 and the inner side portion 1522. The connecting portion 1523 can elastically connect the outer side portion 1521 and the inner side portion 1522. The connecting portion 1523 may have elasticity. At this time, the connecting portion 1523 may be referred to as an 'elastic portion'. The connecting portion 1523 may be formed by bending two or more times.

The first lens driving device 1000 may comprise a support member 1600. The support member 1600 may be a suspension wire. The support member 1600 can movably support the housing 1310. The support member 1600 can elastically support the housing 1310. The support member 1600 may have elasticity at least in part. The support member 1600 can support the movement of the housing 1310 and the bobbin 1210 during OIS driving. At this time, the support member 1600 may be referred to as an 'OIS support member'. The support member 1600 may comprise a plurality of wires. The support member 1600 may comprise four wires that are spaced apart from each other. As a modified embodiment, the support member 1600 may be formed of a plate spring. The support member 1600 may be coupled to the upper elastic member 1510 and the substrate 1410. The support member 1600 may be coupled to the upper elastic member 1510 and the circuit member 1420 of the substrate 1410. The support member 1600 may be soldered to the lower surface of the substrate 1410 penetrating through the hole of the substrate 1410. Alternatively, the support member 1600 may be soldered to the lower surface of the circuit member 1420 penetrating through the hole of the circuit member 1420.

The damper (not shown) of the first lens driving device 1000 may be disposed on the support member 1600. The damper may be disposed on the support member 1600 and in the housing 1310. The damper may be disposed on the elastic member 1500. The damper may be disposed on the elastic member 1500 and/or the support member 1600 to prevent the resonance phenomenon occurring in the elastic member 1500 and/or the support member 1600.

The first lens driving device 1000 may comprise a first sensor (not shown). The first sensor may be a sensor for AF feedback. The first sensor may be disposed on the bobbin 1210. Alternatively, the first sensor may be disposed in the housing 1310. The first sensor may sense movement of the first mover 1200. The first sensor may comprise a Hall sensor. At this time, the Hall sensor can sense the movement of the bobbin 1210 and the lens by sensing the magnetic force of the magnet 1320 or the magnet provided separately. The sensed value sensed by the first sensor may be used for AF feedback control.

The first lens driving device 1000 may comprise a second sensor. The second sensor may be a sensor for OIS feedback. The second sensor may be disposed between the base 1430 and the substrate 1410. The second sensor can sense the movement of the second mover 1300. The second sensor may comprise a Hall sensor. At this time, the hall sensor senses the magnetic force of the magnet 1320 and can detect the movement of the housing 1310 and the magnet 1320. The sensed value sensed by the second sensor can be used for OIS feedback control.

Hereinafter, the configuration of the second lens driving device will be described with reference to the drawings.

Figure 12:
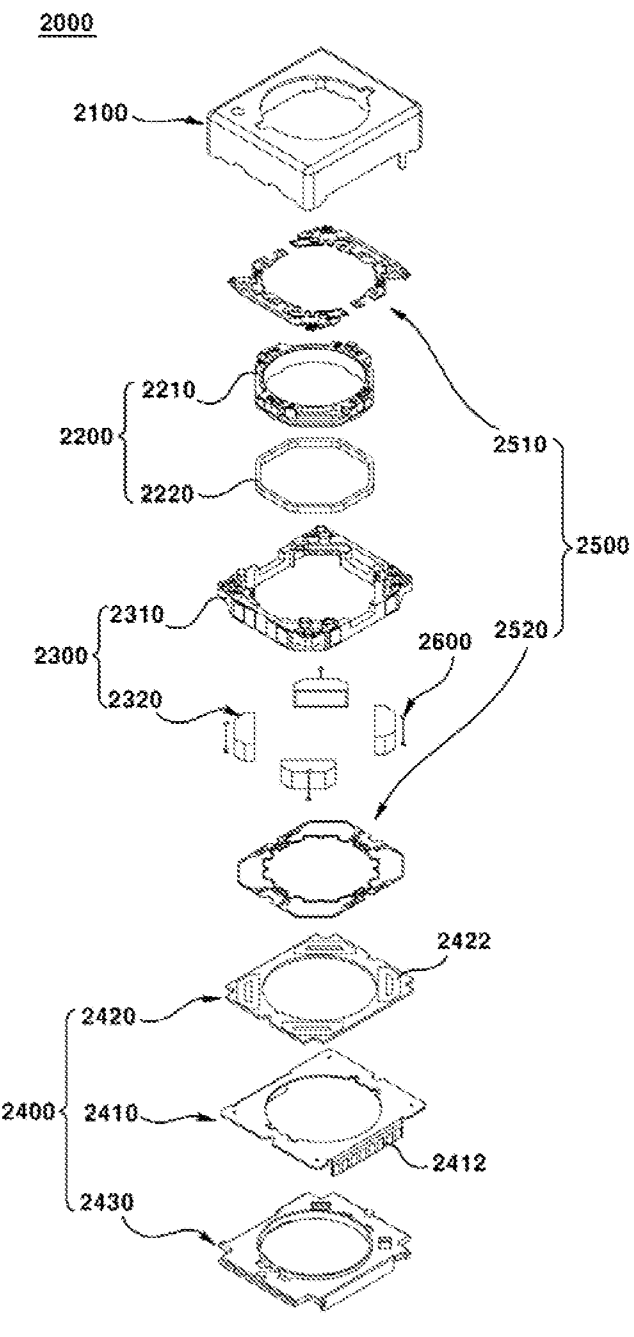
FIG. 12 is an exploded perspective view of the second lens driving device according to the present embodiment.

FIG. 12 is an exploded perspective view of the second lens driving device according to the present embodiment.

The second lens driving device 2000 may be a voice coil motor (VCM).

The second lens driving device 2000 may comprise a cover 2100. The cover 2100 can accommodate the housing 2310 inside. The cover 2100 may be coupled to the base 2430.

The second lens driving device 2000 may comprise a first mover 2200. The first mover 2200 can be moved during AF driving.

The first mover 2200 may comprise a bobbin 2210. The bobbin 2210 may be disposed on the inner side of the housing 2310. The bobbin 2210 may be movably coupled to the housing 2310 by an elastic member 1500.

The first mover 2200 may comprise a first coil 2220. The first coil 2220 may be disposed on the bobbin 2210. The first coil 2220 may face the magnet 2320. The first mover 2200 can perform AF driving through the electromagnetic interaction between the first coil 2220 and the magnet 2320.

The second lens driving device 2000 may comprise a second mover 2300. The second mover 2300 can be moved during OIS driving. The first mover 2200 can be moved with the second mover 2300 during OIS driving.

The second mover 2300 may comprise a housing 2310. The housing 2310 may be disposed outside the bobbin 2210. The housing 2310 can accommodate the bobbin 2210 inside. The housing 2310 may be disposed between the bobbin 2210 and the cover 2100.

The second mover 2300 may comprise a magnet 2320. The magnet 2320 may be disposed in the housing 2310. The magnet 2320 may face the first coil 2220. The magnet 2320 may face the second coil 2422. The magnet 2320 may be disposed at four corners disposed between the four side parts of the housing 2310. The magnet 2320 may comprise four corner magnets disposed in each of the four corner portions.

The second lens driving device 2000 may comprise a stator 2400. The stator 2400 can movably support the second mover 2300.

The stator 2400 may comprise a substrate 2410. The substrate 2410 may be disposed on the base 1430. The substrate 2410 may be disposed between the housing 1310 and the base 1430. The substrate 2410 may comprise a circuit member 2420 that comprises a second coil 2422 facing the magnet 2320. The substrate 2410 may be disposed on the base 2430.

The substrate 2410 may comprise a terminal portion 2412. The substrate 2410 may comprise a terminal portion 2412 formed by being bent partially. The terminal portion 2412 can be coupled to the printed circuit board 11 by soldering.

The substrate 2410 may comprise a circuit member 2420. The circuit member 2420 may comprise a substrate portion and a second coil 2422 formed of a fine pattern coil (FP coil) on the substrate portion. The circuit member 2420 may comprise a second coil 2422. The second coil 2422 may face the magnet 2320. The OIS driving can be performed by the electromagnetic interaction between the second coil 2422 and the magnet 2320.

The stator 2400 may comprise a base 2430. The base 2430 may be disposed on the lower side of the housing 2310. The base 2430 can support the substrate 2410.

The second lens driving device 2000 may comprise an elastic member 2500. The elastic member 2500 may be coupled to the bobbin 2210 and the housing 2310. The elastic member 2500 can support the movement of the bobbin 2210 during AF driving. The elastic member 2500 may comprise an upper elastic member 2510. The upper elastic member 2510 may be disposed on the upper side of the bobbin 2210 and may be coupled to the bobbin 2210 and the housing 2310. The elastic member 2500 may comprise a lower elastic member 2520. The lower elastic member 2520 may be disposed at the lower side of the bobbin 2210 and may be coupled to the bobbin 2210 and the housing 2310.

The second lens driving device 2000 may comprise a support member 2600. The support member 2600 can movably support the second mover 2300. The support member 2600 may be coupled to the upper elastic member 2510 and the substrate 2410.

The present embodiment proposes a structure capable of eliminating mutual interference between the magnets in a voice coil motor (VCM) structure.

In this embodiment, the magnet 1320 of the first lens driving device 1000 is composed of three magnets, the two magnets may be 4-pole magnets, and the remaining one magnet may be a 2-pole magnet. Two first coils 1220 are connected in series facing the 4-pole magnets to provide a driving force required for the AF operation, and a second coil 1422 is disposed at the lower end of each magnet so that OIS driving force in X-axis and Y-axis direction can be provided. In order to center the weight, a dummy mass is disposed on the opposite side of the magnetized 2-pole magnet, thereby preventing the oscillation due to weight eccentricity during OIS operation.

According to the mechanical configuration of the present embodiment, the first coil 1220 is directly wound on the two facing side surfaces among the four side surfaces of the bobbin 1210, and three magnets and a dummy member can be assembled into the housing instead of the four magnets. In the Y-direction, driving force is generated in the categorized components of the two magnetized 4-pole magnets and a pair of second coils 1422, but in the X-direction, driving force is generated in the categorized components of only one magnetized 2-pole magnet and one second coil 1422, therefore the driving force in the X-direction is inevitably small. In order to solve this problem, in the present embodiment, the center axis C1 of the lens is off-centered from the center axis C2 of the product in the direction of the dummy member 1330, and the number of turns of the coil 1422 is increased by utilizing a spare space in the base 1430 side, thereby increasing the driving force in the X-direction.

As in the comparative example, when the 2-pole magnet is used alone, the density of the magnetic field distribution with the adjacent magnets increases, so that attractive force or repulsive force between the adjacent VCMs may occur, which may cause difficulty in controlling of the OIS. The magnetic field distribution according to the comparative example is illustrated in FIG. 13.

In this embodiment, by applying the magnetized 4-pole magnet, the magnetic field interference between the magnets of the two lens driving devices can be reduced. This is illustrated in FIG. 14. Meanwhile, according to the present embodiment, when the attractive force or repulsive force between the adjacent VCMs due to magnetic field interference is designed to be a negligible level, OIS control becomes possible as the influence of magnetic field interference can be ignored.

In this embodiment, the portion of the housing 1310, which has been in contact with the top surface of the magnet 1320 and has a minimum injection thickness, is removed so that the assembly surface of the upper elastic member 1510 and the upper surface of the magnet 1320 can be configured to coincide with each other. In this embodiment, the space that is flush with the assembling surface of the upper elastic member 1510 but not being crossed by the upper elastic member 1510 is filled with the injection material so that the upper plate 1313 of the housing 1310 can be configured with the outer peripheral portion where the stoppers 1314 are located. When viewed from above (as seen in top view), as illustrated in FIG. 11 of the present embodiment, the magnet 1320 can be mechanically restrained by the upper plate 1313 of the housing 1310 connected to the stoppers 1314 of the housing 1310 that exposes a part of the upper surface of the magnet 1320 while maintaining a gap with respect to the cover 1100. That is, the mechanical restraining effect of the magnet 1320 and the effect of assembling the upper surface of the magnet 1320 upwardly can be simultaneously ensured through the present embodiment.

In the above, to have been described as all the components that make up the embodiments of the present invention may operate in combination, or combined into one, the present invention is not necessarily limited to all the components of the embodiments. That is, the present invention may comprise one or more of all the components of the embodiments and be operated through these components. In addition, the term "comprise" described above means that the corresponding components can be embedded unless there is an opposite description therefore it should be interpreted that other components may further be comprised in addition to those corresponding components. In addition, the term 'disposed' as described above should be interpreted as to comprise a case wherein a component is manufactured as a separate member and disposed, and even a case wherein a component is integrally manufactured and disposed.

The above description is only to those described as the technical idea of the present invention by way of example, those skilled in the art that various modifications, additions and substitutions will be possible without departing from the essential characteristics of the present invention. Accordingly, the disclosed invention embodiments is for illustrative and not intended to limit the technical idea of the present invention, not by such an embodiment is the technical scope of the present invention is not limited. The scope of protection of the invention is to be interpreted by the following claims, all spirits within a scope equivalent will be construed as included in the scope of the present invention.

What is claimed is:

1. A lens driving device comprising:

a base;

a housing disposed on the base;

a bobbin disposed in the housing;

a magnet and a first coil configured to move the housing with respect to the base; and an upper elastic member coupled with the housing and an upper surface of the bobbin, wherein the magnet comprises a first magnet unit, a second magnet unit, and a third magnet unit, wherein the first coil comprises a first coil unit disposed at a position corresponding to the first magnet unit, a second coil unit disposed at a position corresponding to the second magnet unit, and a third coil unit disposed at a position corresponding to the third magnet unit, wherein the housing is configured to move in an x-axis direction through an interaction between the first magnet unit and the first coil unit, wherein the housing is configured to move in a y-axis direction perpendicular to the x-axis direction through interactions between the second magnet unit and the second coil unit and between the third magnet unit and the third coil unit, and wherein an upper surface of the second magnet unit comprises a first area overlapped with the upper elastic member in an optical axis direction, a second area overlapped with the housing in the optical axis direction, and a third area not overlapped with both the upper elastic member and the housing in the optical axis direction.

2. The lens driving device of claim 1, wherein the first area of the second magnet unit is not overlapped with both the housing and the bobbin in the optical axis direction so that the first area of the second magnet unit directly faces the upper elastic member, wherein the first area of the second magnet unit is contacted with a first portion of the upper elastic member, wherein, when viewed from above, an upper surface of the first portion of the upper elastic member is visible, and wherein the second area of the second magnet unit is coupled with an upper plate of the housing.

3. The lens driving device of claim 1, comprising a substrate disposed on the base and comprising the first coil, wherein the housing comprises first and second side parts opposite to each other, and third and fourth side parts opposite to each other, wherein the first magnet unit is disposed on the first side part, wherein the second magnet unit is disposed on the third side part, wherein the third magnet unit is disposed on the fourth side part, wherein the substrate comprises a hole, an inner circumferential surface formed by the hole, a first side surface disposed at a position corresponding to the first side part of the housing, and a second side surface disposed at a position corresponding to the second side part of the housing, and wherein a distance between the inner circumferential surface of the substrate and the first side surface of the substrate is greater than a distance between the inner circumferential surface of the substrate and the second side surface of the substrate.

4. The lens driving device of claim 3, wherein the substrate comprises a third side surface disposed at a position corresponding to the third side part of the housing, and a fourth side surface disposed at a position corresponding to the fourth side part of the housing, and wherein a distance between the third side surface and the fourth side surface is greater than a distance between the first side surface and the second side surface.

5. The lens driving device of claim 4, wherein the substrate comprises a body portion comprising the first to fourth side surfaces, and a terminal portion comprising a plurality of terminals, and wherein the terminal portion extends from each of the second and third side surfaces of the body portion.

6. The lens driving device of claim 1, wherein a lengthwise direction length of the first coil unit is greater than a lengthwise direction length of each of the second and third coil units.

7. The lens driving device of claim 1, wherein a widthwise direction length of the first coil unit is greater than a widthwise direction length of each of the second and third coil units.

8. The lens driving device of claim 1, wherein the first magnet unit is a 2-pole magnet, and wherein each of the second magnet unit and the third magnet unit is a 4-pole magnet.

9. The lens driving device of claim 1, comprising:

a second coil disposed on the bobbin, wherein the second coil comprises a fourth coil unit disposed between the bobbin and the second magnet unit, and a fifth coil unit disposed between the bobbin and the third magnet unit, and wherein the second coil is not disposed between the bobbin and the first magnet unit.

10. The lens driving device of claim 9, comprising:

a support member coupled with the upper elastic member, wherein the fourth coil unit of the second coil and the fifth coil unit of the second coil are electrically connected, wherein the upper elastic member comprises first and second upper elastic units spaced apart from each other, and wherein one side end portion of the fourth coil unit of the second coil is coupled with the first upper elastic unit and one side end portion of the fifth coil unit of the second coil is coupled with the second upper elastic unit.

11. The lens driving device of claim 1, comprising a dummy member, wherein the housing comprises first and second side parts opposite to each other, and third and fourth side parts opposite to each other, wherein the first magnet unit is disposed on the first side part, wherein the second magnet unit is disposed on the third side part, wherein the third magnet unit is disposed on the fourth side part, wherein the dummy member is disposed on the second side part of the housing, and wherein the dummy member comprises a non-magnetic material, or an intensity of a magnetism of the dummy member is weaker than an intensity of a magnetism of the first magnet unit.

12. The lens driving device of claim 11, comprising:

a second coil disposed on the bobbin, wherein the second coil is not disposed between the bobbin and the dummy member in a direction perpendicular to an optical axis direction, and wherein the first coil is not disposed between the dummy member and the base in the optical axis direction.

13. A camera module comprising the lens driving device of claim 1.

14. The camera module of claim 13, comprising a second lens driving device adjacent to the lens driving device, wherein the second lens driving device comprises:

a housing;

a bobbin disposed in the housing of the second lens driving device;

a third coil disposed on an outer circumferential surface of the bobbin of the second lens driving device;

a magnet disposed on the housing of the second lens driving device and facing the third coil; and a fourth coil disposed at a position corresponding to the magnet of the second lens driving device, wherein the magnet of the second lens driving device comprises four magnet units disposed at four corners of the housing of the second lens driving device.

15. An optical apparatus comprising:

a main body;

the camera module of claim 13 disposed on the main body; and a display disposed on the main body and outputting an image photographed by the camera module.

16. The lens driving device of claim 1, comprising a wire configured to movably support the housing.

17. The lens driving device of claim 1, wherein the number of turns of a coil wound in the first coil unit is greater than the number of turns of a coil wound in the second coil unit.

18. The lens driving device of claim 17, wherein the number of turns of a coil wound in the third coil unit is the same as the number of turns of the coil wound in the second coil unit.

19. A lens driving device comprising:

a base;

a housing disposed on the base;

a bobbin disposed in the housing;

a magnet and a first coil configured to move the housing with respect to the base;

an upper elastic member coupled with the housing and an upper surface of the bobbin; and a wire configured to movably support the housing, wherein the magnet comprises a first magnet unit, a second magnet unit, and a third magnet unit, wherein the first coil comprises a first coil unit facing the first magnet unit, a second coil unit facing the second magnet unit, and a third coil unit facing the third magnet unit, wherein the housing is configured to move in a first direction through an interaction between the first magnet unit and the first coil unit, wherein the housing is configured to move in a second direction different from the first direction through interactions between the second magnet unit and the second coil unit and between the third magnet unit and the third coil unit, and wherein an upper surface of the second magnet unit comprises a first area overlapped with the upper elastic member in an optical axis direction, a second area overlapped with the housing in the optical axis direction, and a third area not overlapped with both the upper elastic member and the housing in the optical axis direction.

20. The lens driving device of claim 19, wherein a widthwise direction length of the first coil unit is greater than a widthwise direction length of each of the second and third coil units.

* * * * *